(12) United States Patent
Thacker

(10) Patent No.: US 7,322,008 B2
(45) Date of Patent: Jan. 22, 2008

(54) ORGANIZING, EDITING, AND RENDERING DIGITAL INK

(75) Inventor: Charles P Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/019,479

(22) Filed: Dec. 23, 2004

(65) Prior Publication Data

US 2005/0114773 A1 May 26, 2005

Related U.S. Application Data

(62) Division of application No. 10/103,700, filed on Mar. 25, 2002, now Pat. No. 7,120,872.

(51) Int. Cl.
*G06F 17/00* (2006.01)

(52) U.S. Cl. ............... 715/541; 715/512; 382/186

(58) Field of Classification Search ........... 715/512, 715/541; 382/186
See application file for complete search history.

(56) References Cited

U.S. PATENT DOCUMENTS

| 5,029,223 | A | | 7/1991 | Fujisaki |
| 5,220,649 | A | | 6/1993 | Forcier |
| 5,231,698 | A | | 7/1993 | Forcier |
| 5,303,311 | A | * | 4/1994 | Epting et al. ............ 382/197 |
| 5,341,438 | A | * | 8/1994 | Clifford ................. 382/179 |
| 5,454,046 | A | * | 9/1995 | Carman, II ............. 382/186 |
| 5,953,735 | A | | 9/1999 | Forcier |
| 5,956,419 | A | | 9/1999 | Kopec et al. |
| 5,991,441 | A | | 11/1999 | Jourjine |
| 6,130,962 | A | | 10/2000 | Sakurai |
| 6,333,994 | B1 | * | 12/2001 | Perrone et al. ........... 382/186 |
| 6,621,941 | B1 | | 9/2003 | Syeda-Mahmood et al. |
| 2003/0046087 | A1 | | 3/2003 | Johnston et al. |
| 2004/0136591 | A1 | | 7/2004 | Morwing et al. |

OTHER PUBLICATIONS

Hong, Jason I., et al, "SATIN: A Toolkit for Informal Ink-Based Applications", Proceedings of the 13th Annual ACM Symposium on User Interface Software and Technology UIST '00, Nov. 2000, pp. 63-72.*

Bailey, Brian P., et al, "Authoring Support: DEMAIS: Designing Multimedia Applications With Interactive Storyboards", Proceedings of the Ninth ACM International Conference on Multimedia, Oct. 2001, pp. 241-250.*

André Meyer, "Pen Computing: A Technology Overview and a Vision", vol. 27, No. 3, *SIGCHI Bulletin*, pp. 46-90, Jul. 1995.

(Continued)

*Primary Examiner*—William Bashore
*Assistant Examiner*—Laurie Ries
(74) *Attorney, Agent, or Firm*—Banner & Witcoff, Ltd.

(57) ABSTRACT

A pen-based computing system supports organizing, editing, and rendering handwritten digital ink. A given page of text may include several word flows, but the flows may be prevented from overlapping one another, and each word and stroke may be assigned to only one flow on the page. Various functions are available to open up additional space in a flow, to reflow the words in a flow, and to normalize the spacing between words in a flow.

17 Claims, 17 Drawing Sheets

OTHER PUBLICATIONS

Jim Rhyne, "Dialogue Management for Gestural Interfaces", *Computer Graphics*, vol. 21, No. 2, pp. 137-142, Apr. 1987.

Dean Rubine, "Specifying Gestures by Example", *Computer Graphics*, vol. 25, No. 4, pp. 329-337, Jul. 1991.

James Arvo et al., "Fluid Sketches: Continuous Recognition and Morphing of Simple Hand-Drawn Shapes", *CHI Letters*, vol. 2, pp. 73-80, 2000.

Jean-Daniel Fekete et al., "TicTacToon: A Paperless System for Professional 2D Animation", *Proceedings of the 22nd Annual Conference on Computer Graphics and Interactive Techniques*, Sep. 1995.

Co-pending U.S. Appl. No. 10/103,700 filed Mar. 25, 2002 and co-pending U.S. Appl. No. 11/019,479 filed Dec. 23, 2004.

Wilcox, Lynn D. et al., "Dynomite: A Dynamically Organized Ink and Audio Notebook", Proceedings of the SIGCHI Conference on Human Factors in Computing Systems, pp. 186-193, Mar. 1997.

Kamel, Ibrahim, "Fast Retrieval of Cursive Handwriting", Proceedings of the Fifth International Conference on Information and Knowledge Management, pp. 91-98, Nov. 1996.

Aref. Walid, "The Handwritten Trie: Indexing Electronic Ink", ACM SIGMOD Record, vol. 24, Issue 2, pp. 151-162, May 1995.

* cited by examiner

| For the Following IAF: | |
|---|---|
| Case | Assignment |
| 000 | Put Stroke in New Flow at Average Line |
| 001 | Add Stroke to Final Flow at Average Line |
| 010, 011, 012, 110, 112, 120, 121 | Add Stroke to Average Flow at Average Line |
| 100 | Add Stroke to Initial Flow at Initial Line if Final Line is Lower than Initial Line, Otherwise add at Average Line |
| 101 | Add Stroke to Initial Flow at Initial Line |
| 102, 123 | Erase Stroke |
| 111, 122 | If Final Line is Lower than Initial Line, then Add Stroke to Initial Flow at Initial Line, Otherwise Add to Average Flow at Average Line |

FIG. 12

ORGANIZING, EDITING, AND RENDERING DIGITAL INK

CROSS-REFERENCE TO RELATED APPLICATIONS

This application is a division of prior U.S. application Ser. No. 10/103,700, filed Mar. 25, 2002, now U.S. Pat. No. 7,120,872, the entire contents of which are incorporated herein by reference.

TECHNICAL FIELD

Aspects of the present invention are directed generally to apparatuses and methods for controlling a graphical user interface (GUI). More particularly, aspects of the present invention relate to capturing and/or storing electronic or digital ink.

BACKGROUND

Typical computer systems, especially computer systems using graphical user interface (GUI) systems, such as Microsoft WINDOWS®, are optimized for accepting user input from one or more discrete input devices, such as a keyboard for entering text, and a pointing device, such as a mouse with one or more buttons, for operating the user interface. The ubiquitous keyboard and mouse interface provides for fast creation and modification of documents, spreadsheets, database fields, drawings, photos and the like. However, a significant gap exists between the flexibility provided by the keyboard and mouse interface compared with non-computer (i.e., standard) pen and paper. With the standard pen and paper, a user edits a document, writes notes in a margin, draws pictures and other shapes, links separate sets of notes by connecting lines or arrows, and the like. In some instances, a user may prefer to use a pen to mark-up a document rather than review the document on-screen because of the ability to freely make notes outside of the confines of the keyboard and mouse interface.

Some computer systems permit a user to draw on a screen. For example, the Microsoft READER application permits one to add digital ink (also referred to herein as "electronic ink" or "ink") to a document. The system stores the ink and provides it to a user when requested. Other applications (for example, drawing applications as known in the art associated with the Palm 3.x and 4.x and PocketPC operating systems) permit the capture and storage of drawings. These drawings may include other properties associated with the ink strokes used to make up the drawings. For instance, line width and color may be stored with the ink. One goal of these systems is to replicate the look and feel of physical ink being applied to a piece of paper.

One activity normally reserved for physical ink and paper is note taking. Personal notes are unique as each user. Some users take notes using complete sentences, while others jot down thoughts or concepts and then link the concepts using arrows and the like. The latter type of notes tends to be written at different locations on a page. Additionally, some revisit notes later and add further thoughts, clarify and/or edit previously recorded notes. The value present in handwritten notes may rest not only in the actual text of the information recorded, but also in the layout of the notes and the juxtaposition of some notes with others. Further value may be added in the speed at which users take notes.

The transition from an ink pen and physical paper note taking arrangement to a computer-based note taking arrangement may prove difficult. While computer-based note taking systems can provide advantages including handwriting recognition functionality and written text reformatting, users may quickly become disoriented when the computer-based system does not function as expected.

A number of systems for electronically capturing, rearranging, and displaying handwriting as digital ink are known (for example, the InkWriter® system from Aha! Software, now owned by Microsoft Corporation of Redmond, Wash.). These systems capture ink strokes and group the strokes into characters and words. Writing in multiple regions on a page, as many users do, can quickly confuse these systems, for example, if information intended to be separate notes is combined by the system into a single, incoherent note. Also, in some existing systems, drag selection (akin to holding down a mouse button and dragging to select text in a text editor) may select large areas of blank space (i.e., white space) on the page. When this selected text is cut and pasted (using standard computer-based text editing concepts), the large volume of selected blank space may produce an unintended and surprising result. This result is counterintuitive to the average computer user because conventional text editing systems work differently. The unfamiliar operation of a note taking system compared to known text based systems effectively creates barriers to adoption of stylus-based computing systems.

SUMMARY

The present invention provides flexible and efficient systems, methods, and data structures for organizing, editing, and rendering digital ink.

Aspects of the present invention are directed to improved systems, methods and data structures for associating captured ink words and text words in flows and editing the flows. In some examples, a user's interactions are confined to a single active flow of ink and/or text words. In other examples, space may be inserted or minimized inside a flow. In additional examples, the shape of a flow may be reorganized around another flow or flows on the page. In yet other examples, the flow to which new ink strokes belong may be determined based on the relationships of the new ink strokes to existing flows.

These and other features and aspects of the invention will be apparent upon consideration of the following detailed description.

BRIEF DESCRIPTION OF DRAWINGS

The foregoing summary, as well as the following detailed description, may be better understood when read in conjunction with the accompanying drawings, which are included by way of example, and not by way of limitation with regard to the claimed invention.

FIG. 12 illustrates a table showing information useful in assigning strokes to flows in accordance with various examples of the invention.

DETAILED DESCRIPTION

Figure 1:
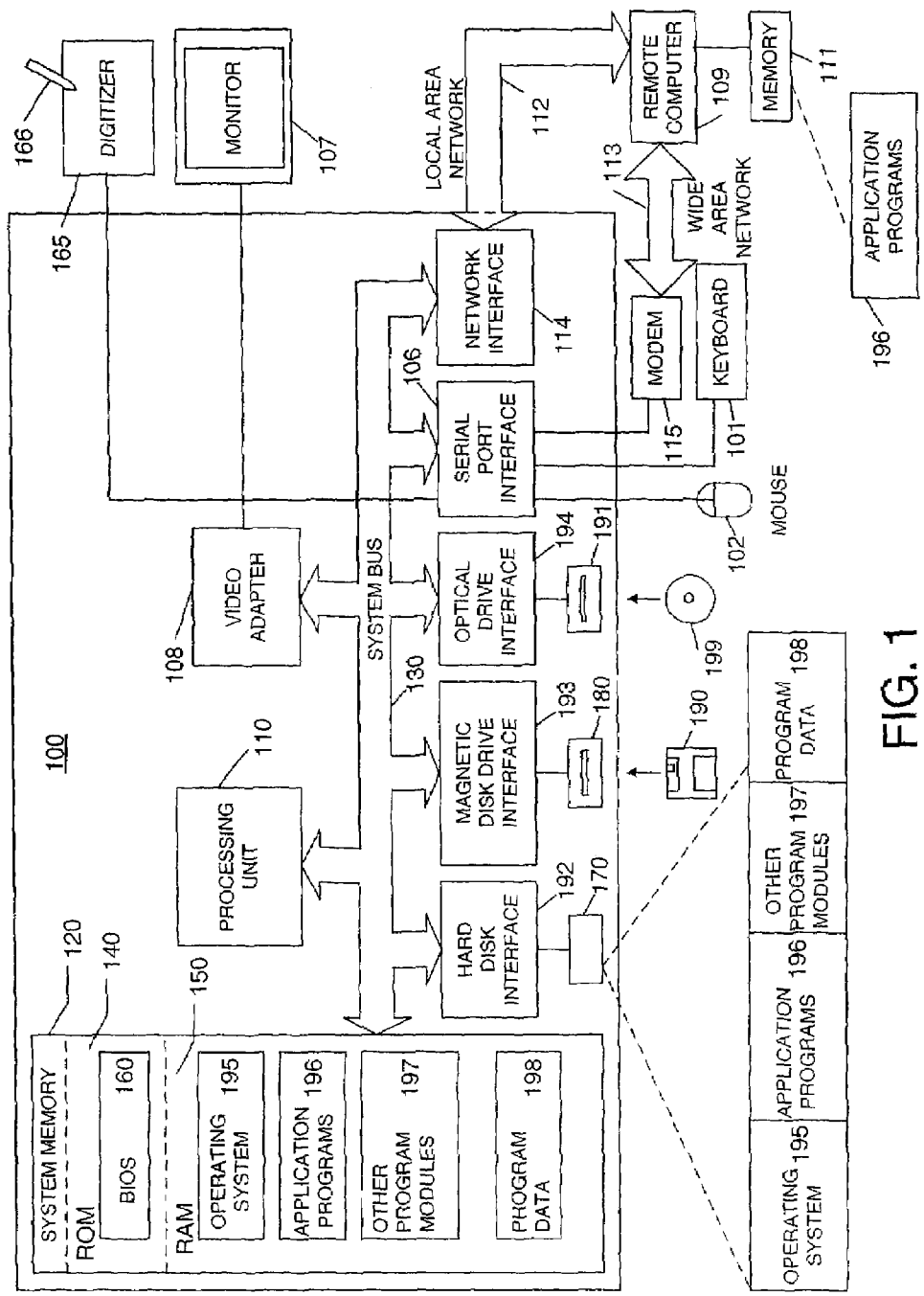
FIG. 1 illustrates a schematic diagram of an exemplary general-purpose digital computing environment that may be used to implement various aspects of the present invention.

As described above, examples of the present invention relate to data structures, systems, and methods for organizing, editing, and rendering digital ink, e.g., in a pen-based computing system. The following describes various examples of the invention in more detail.

The following description is divided into sub-sections to assist the reader. The sub-sections include: Terms, General-Purpose Computer, Flows, and Data Structures.

I. Terms

Ink—A sequence or set of handwritten strokes. A sequence of strokes may include strokes in an ordered form. The sequence may be ordered by the time the stroke was captured or by where the strokes appear on a page. Other orders are possible. A set of strokes may include sequences of strokes or unordered strokes or any combination thereof.

Stroke—A sequence or set of captured points. For example, when rendered, the sequence of points may be connected with lines. Alternatively, a stroke may be represented as a point and a vector in the direction of the next point. Further, a stroke may be referred to as a simple list (or array or table) of points. In short, a stroke is intended to encompass any representation of points or segments relating to ink, irrespective of the underlying representation of points and/or what connects the points.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, Θ), three dimensional coordinates ((X, Y, Z), (r, Θ, ρ), (X, Y, t (where t is time)), (r, Θ, t)), four dimensional coordinates ((X, Y, Z, t) and (r, Θ, ρ, t)), and other techniques as known in the art.

Render—The process of determining how graphics (and/or ink) are to be displayed, whether on a screen or printed.

Ink Word—One or more handwritten strokes captured by systems according to the invention. Each stroke in an ink word has a location associated with the stroke.

Text Word—Machine-generated text. Text words may be introduced into the systems of the invention in any suitable manner, such as by an input device (e.g., a keyboard), by downloading (e.g., from memory or a network connection), by selecting from a menu, or from input ink words converted to machine-generated text via handwriting recognition software.

Flow—A region on a page containing at least one stroke or at least one text word or character. Flows, at least in some operational examples, may include at least one insertion region for adding additional strokes and/or text words and/or ink words and/or text characters. In the context of the data structure, a "flow" may be considered to be a linear list of words (ink words or text words).

Space—An area with no displayed content. In some instances, when referring to separations between words in a flow (also called "inter-word spacing") "space" may refer to a separate word with no strokes. When referring to a blank area on a page, "space" may refer to area on the page unclaimed by a flow.

Page Grid—A data structure that supports representation of flows on a page.

II. General-Purpose Computer

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 199, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
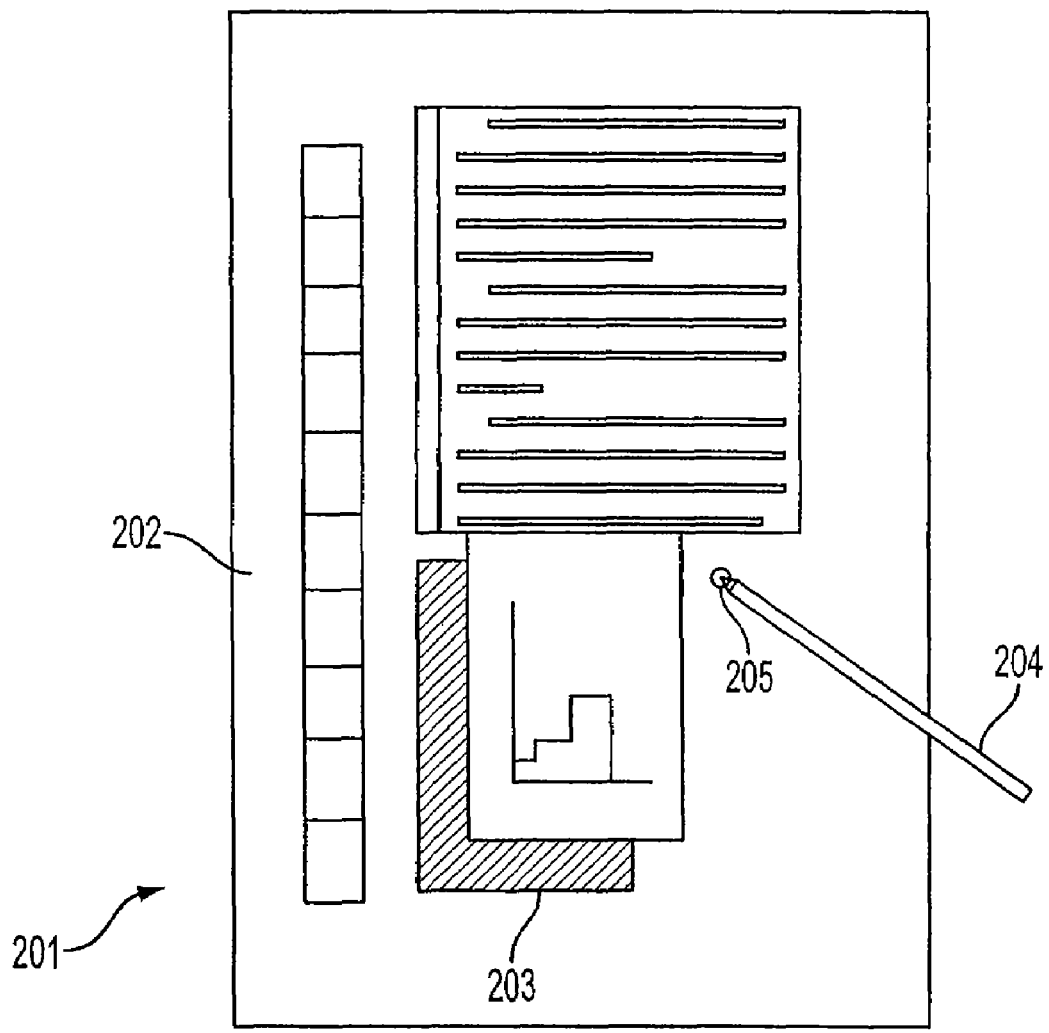
FIG. 2 illustrates an exemplary pen-based computing system that may be used in accordance with various aspects of the present invention.

FIG. 2 illustrates an exemplary pen-based computing system 201 that may be used in accordance with various aspects of the present invention. Any or all of the features, subsystems, and functions in the system of FIG. 1 may be included in the computer of FIG. 2. Pen-based computing system 201 includes a large display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end, and which, when moved across the display, indicates portions of the display to be erased. Other types of input devices, such as a mouse, trackball, or the like may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204. Region 205 shows a feedback region or contact region permitting the user to determine where the stylus 204 contacted the display surface 202.

Figure 3:
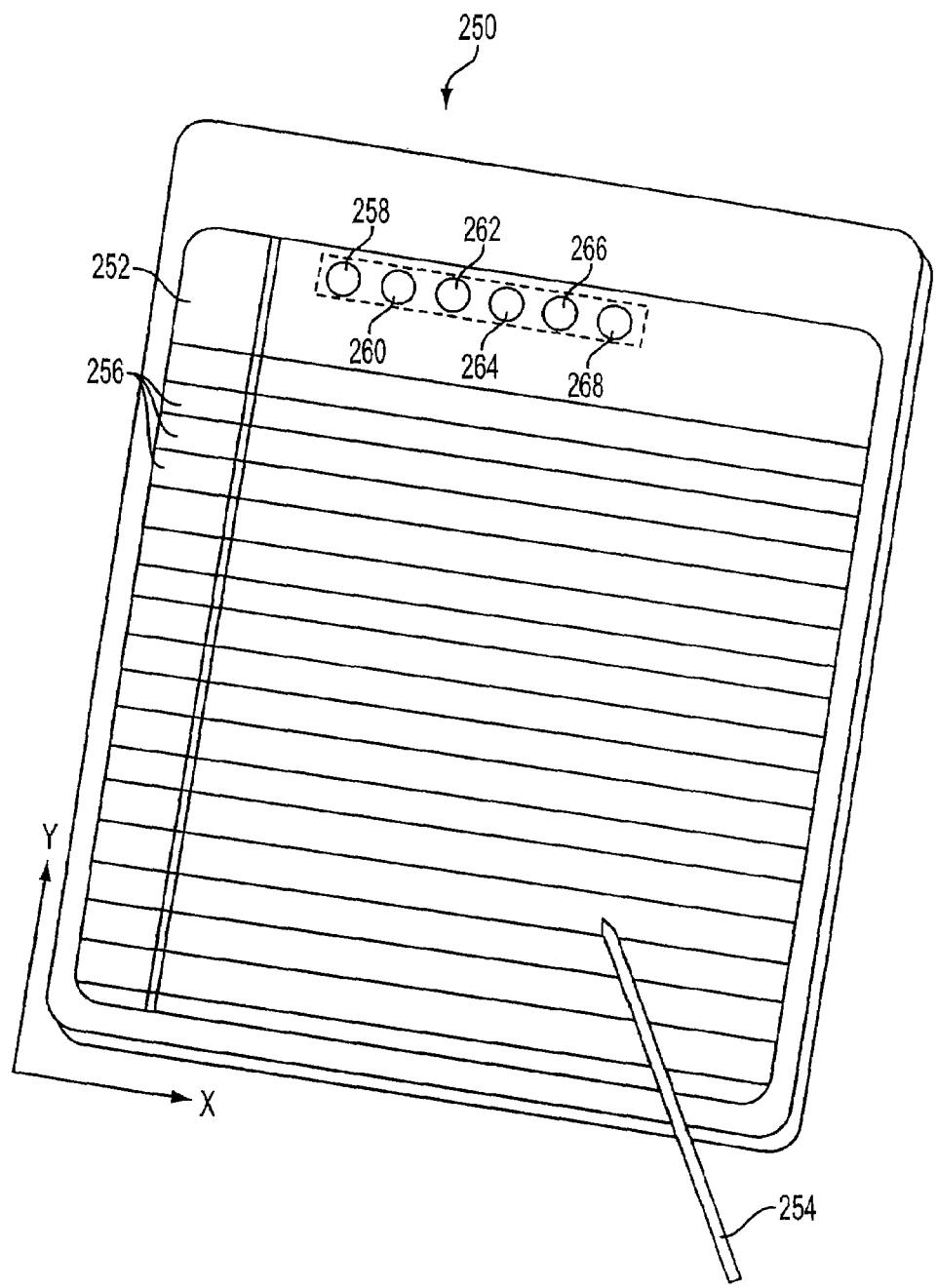
FIG. 3 illustrates another example of a pen-based computing system that may be used in accordance with various aspects of the present invention.

FIG. 3 illustrates another example of a pen-based computing system 250 in accordance with examples of the present invention. In this example, the pen-based computing system 250 includes a large display surface 252 (also called a "page template" in this specification), which may be the same as those described above. Using stylus 254 or other appropriate user input device (like those described above), a user may select, highlight, and/or write on the digitizing display surface 252.

When the system is set to receive text information, the face of the display surface 252 may appear like a conventional piece of paper, including a plurality of individual lines 256 on which text may be entered. Each line 256 may be thought of as extending in the horizontal (or X coordinate) direction, and a plurality of lines 256 are arranged or stacked in the vertical (or Y coordinate) direction. The terms "X coordinate direction," "Y coordinate direction," "horizontal direction," and "vertical direction" are used herein to denote the orientation of the pen-based computing system in its common, conventional use (for writing in English). The use of these terms should not be construed as limiting the invention to any particular orientation of the page template. For example, the page template may be arranged to accept user input written in a vertical manner without departing from the scope of the invention.

As used herein, the terms "line" or "line number" mean the text line, like lines 256 illustrated in FIG. 3, unless a different meaning is evident from the context. The term "coordinates" may be absolute (for example, the specific X and Y coordinate values for a specific point or pixel on the page template) or may be relative to other points, objects, or locations. To distinguish, each individual line 256 in FIG. 3 has a height, and several Y coordinate points may be contained over this height (the actual number of Y coordinate points or pixels per line will depend, for example, on the height of the line and the resolution of the page template screen). If desired, the height of lines 256 may be adjustable or customizable, to better suit the needs of individual users.

III. Flows

As noted above, a "flow" is a region on a page template that contains at least one stroke and/or at least one text word or character, and it may include at least one insertion region for adding additional strokes and/or ink words and/or text words and/or text characters. Systems and methods according to various examples of the invention may include two types of flows, namely drawing flows and text flows. As will be explained in more detail below, in some examples according to the invention, any given page may contain one or more different flows. If a page contains multiple flows, like that shown in FIG. 4, the page may include all drawing flows (like flow 270), all text flows (like flows 272, 274, 276, 278, and 280), or a combination of drawing and text flows, without departing from the scope of the invention.

Also, in some examples of the invention, flows are held completely independent of one another such that flows do not overlap with one another, and such that action on one flow does not affect the location, layout, size, or other characteristics of any other flow. This is not an absolute requirement in all examples of the invention. For example, if desired, systems and methods according to the invention may be arranged to tie the location of a first flow to a specific stroke or word in a second flow. Then, when the second flow is reflowed for any reason (reflow is explained in more detail below), the first flow may move to be located on the line adjacent the new, reflowed location of the stroke or word to which it was tied. This feature may be useful when notes in one flow have a special relevance or relationship to a specific word or group of words in another flow. Also, if desired, the systems and methods according to examples of the invention may include the ability to merge two flows together or divide a single flow into two or more independent flows.

Figure 4:
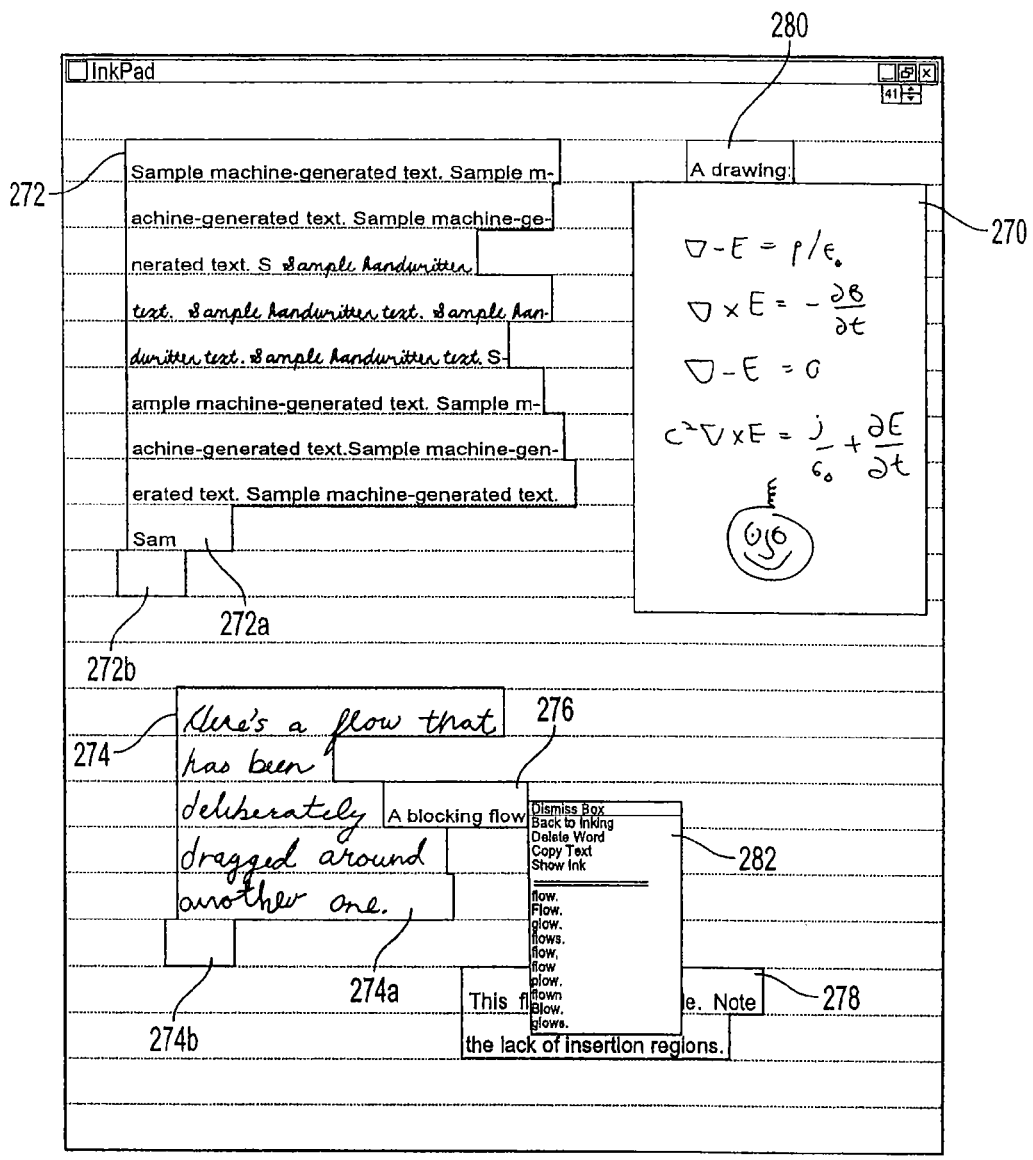
FIG. 4 illustrates an example of a page template of a pen-based computing system that contains both text flows and drawing flows.

Exemplary characteristics and features of text flows and drawing flows will be described in more detail below for various examples of the invention. To assist the reader, the following section is subdivided as follows:

A. Text Flows
   1. Operations
      a. Ink Entry Mode
         i. Stroke Capture
         ii. Insertion Regions and New Stroke Assignment to Flows
         iii. Non-Insertion Region Use
         iv. An Example of Assigning Strokes
      b. Editing Mode
         i. Operations
            1. Reflow
            2. Open Space/Close Space/Normalize
            3. Other Features
         ii. Techniques of Operation
            1. Context Menus
            2. Buttons
      c. Switching Between Operational Modes
         i. Selection Based
         ii. UI Selection
         iii. Stylus
         iv. Alternative Switching
      d. Stroke Operations
         i. Stroke Selection
         ii. Stroke Markup
   2. Display Characteristics
   3. Mode Independent Operations
      a. Space Tool, Reflow, Normalize
      b. Text or Ink Input Window
B. Drawing Flows
   1. Ink Entry
   2. Editing Mode A. Text Flows "Text flows" are flow regions on a page that contain strokes and/or words, which may be handwritten "ink words," handwritten "ink strokes," machine-generated "text words," and/or machine-generated "text characters." FIG. 4 illustrates an example of a page template containing several different text flows 272, 274, 276, 278, and 280. Text flows differ from drawing flows (e.g., flow 270 in FIG. 4, discussed in more detail below) in that text flows are treated by the system as containing or potentially containing machine-generated text words. Handwritten ink words or strokes in text flows may be recognized by handwriting recognition software and/or replaced on the display by machine-generated text words or characters, if desired. The handwriting recognition software, if desired, may be activated automatically and/or periodically by the system (e.g., running in background) as the user enters text and/or it may be activated on the user's command with respect to the entire content of an active flow and/or with respect to a selected portion of ink words within the active flow. Any given text flow may contain both ink words and text words. Note, for example, flow 272 in FIG. 4.

The "active flow" is the flow region on the page that is the "target" flow ready to receive ink or editorial commands. In some examples of the invention, only one flow is active at a given time. In some examples, when the input device hovers over the page template, the last flow encountered by the input device may be the active flow or the flow over which the input device hovers may be the active flow. The active flow may be readily changed by the user e.g., by tapping inside a non-active flow (e.g., with an inactive input device) or hovering over the flow (e.g., with an active input device). A variety of operations are permitted in the various flows.

1. Operations

Users accustomed to conventional computing systems are familiar with using keyboards for data entry and mice (or related pointing devices) for user interface control. In pen-based computing systems, however, users generally use a stylus for both data entry and interface control. Some users may experience difficulties in using the same input device for both types of input. Likewise, some users may have difficulty in conceptualizing the differences between various actions in these stylus-based computing platforms. To minimize confusion, some examples of the invention include the use of various operational modes to permit users to operate in one operational mode and then actively switch to the other or another operational mode. Text flows in accordance with some examples of the invention include two primary operational modes, namely an "ink entry" mode and an "editing" mode. These operational modes are described in more detail below.

a. Ink Entry Mode

Figure 5:
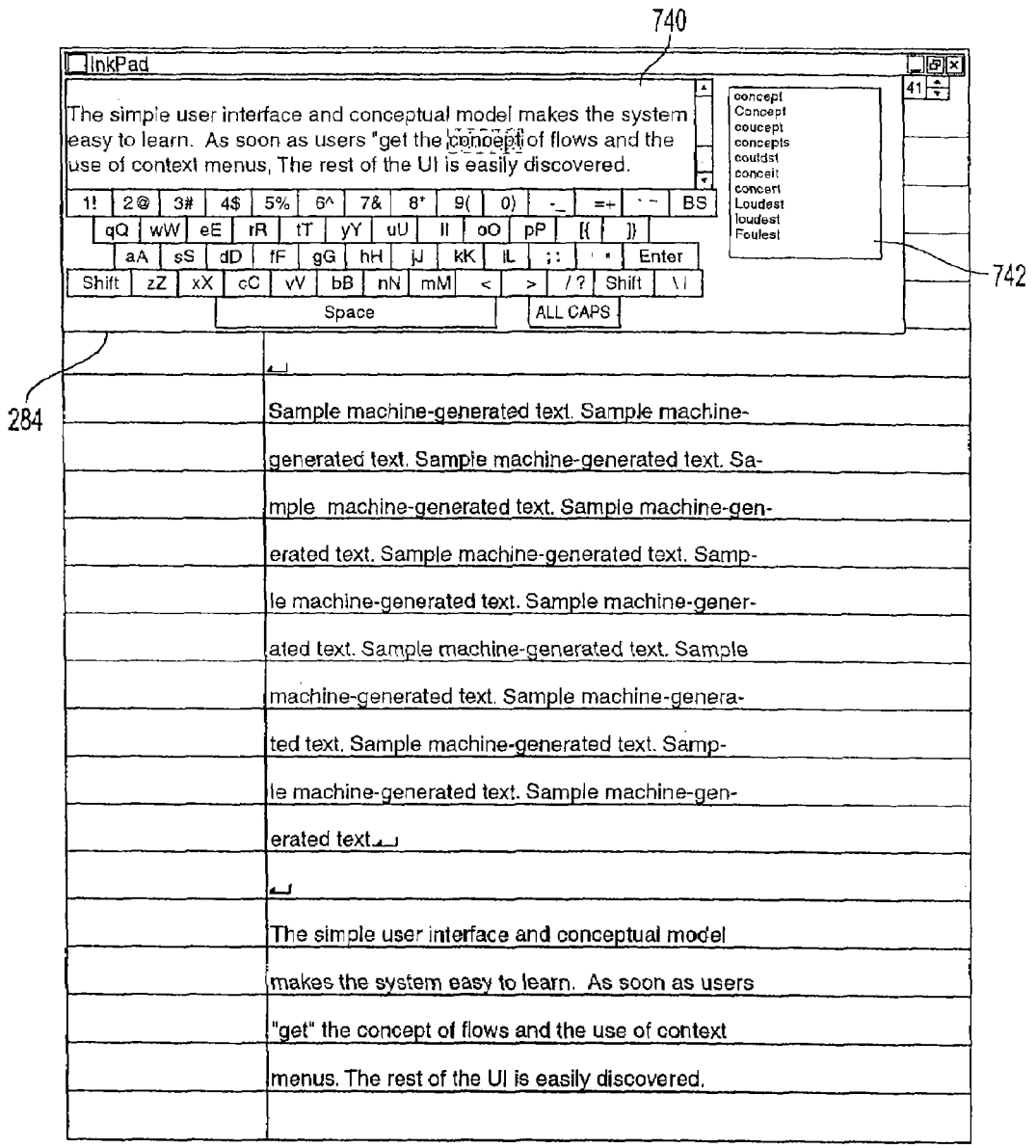
FIG. 5 illustrates a text input panel and text converted from ink to machine-generated text as may be used in some examples of the invention.

A first system operational mode is referred to as an "ink entry" or "inking" mode in which a user may enter electronic ink to form ink words. The ink words may be converted into text words using character or word recognition technology, examples of which are known in the art. The conversion may occur automatically and immediately, after a short delay, upon entry into the edit mode, upon command, or never, depending on the system or the desires of the user. The ink entry mode is one main mode for entering data for stylus-based computing systems according to the invention, although data optionally can be entered in other manners as well, such as by downloading from an external memory, e.g., via a disk, a keyboard, a text input panel, from the Internet, etc. One example of a text input panel 284 (also called a "soft keyboard") is illustrated in FIG. 5.

Data entry for flows may be made by capturing strokes and assigning them to a flow.

i. Stroke Capture

When a user creates electronic ink, the captured strokes may be combined into ink words. The ink words are grouped into flows, optionally along with pre-existing text or ink words. A stroke includes the points encountered during stylus contact with the digitizing display surface (for example, a stroke is all points between a pen down event and a pen up event). A stroke may be rendered to the display of the page template as a series of lines connecting between the points, or by any of several other ways well known to graphics practitioners.

Stroke capture starts when the pen goes down. Once capture has started, the data structure used to support the flows on the page (referred to as a "page grid" described below) may be consulted to determine the initial flow (i.e., the flow owning the space in which the pen went down). Alternatively, the system may wait until the pen has been lifted before consulting the data structure to determine the initial flow. As the pen is dragged, the system builds a list of points corresponding to the path of the stroke, as well as the stroke's bounding rectangle and its average Y coordinate. When the pen is lifted, the flow owning the space corresponding to the point at which the pen went up is also determined (also called the "final flow"). Additionally, the flow owning the space of the (initial X-coordinate, average Y-coordinate) point of the stroke also is determined (called the "average flow"). Any or all of the initial, average, and final flows may be null if the pen goes down, spends its time on average, or goes up in unclaimed space (i.e., space not claimed by an existing flow).

In various examples, some of the calculations are not performed until a later time or until needed. For example, upon lifting the pen from a digitizing display surface (also referred to as a "pen up" event), only the final flow may be determined. Other determinations including average Y coordinate, line of the display containing most of the stroke, bounding box, and others need not be made until a later time or until needed. Additionally, if the location of the pen during a pen down event (placement of the pen on the digitizing display surface) is in a particular region as opposed to another region, various operations may be performed as opposed to others. These determinations under various circumstances are discussed in more detail below.

Various techniques for storing information relating to strokes may be used in examples of systems and methods according to the invention. For example, all the points of a stroke may be stored. Alternatively, rather than remembering each point, it may be advantageous to limit the storage points to every point on the stroke where the direction of the stroke changes. Because the stroke may be rendered as a series of straight lines between adjacent points (i.e., adjacent pixels on the page template contacted by the user input device), the intermediate points are superfluous when the points lie on a straight line. By not saving these superfluous intermediate points (e.g., many intermediate points along the line of the letter "t" in the example of FIG. 6), a substantial amount of storage space may be saved (e.g., approximately 30%). Reducing the volume of data also assists the systems and methods according to these examples to more quickly conduct various operations described herein (such as reflow, open space, close space, etc.).

Figure 6:
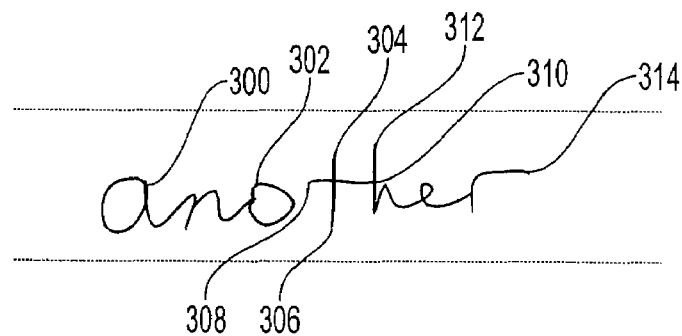
FIG. 6 illustrates stroke capture as used in various aspects of the present invention.

FIG. 6 illustrates an example of capturing strokes in accordance with examples of the present invention. In FIG. 6, the word "another" is handwritten like it might be written on a page template of a pen-based computing system. In this example, the user input device first contacted the page template at point 300, the beginning of the letter "a." The user input device was first lifted after the letter "o" had been written (at point 302). In this example, stroke capture begins when the user input device goes down (e.g., point 300). As the input device is dragged, a list of points is built corresponding to the path of the stroke until the user input device is lifted from the page template (e.g., from point 300 to 302). Suitable systems for electronically capturing strokes in this manner are known to those skilled in this art.

The next stroke in FIG. 6 begins the vertical line for the letter "t" (point 304) and ends at the bottom of this line (point 306). The user input device next contacts the page template at point 308, to begin the horizontal cross of the letter "t," and it picks up again at point 310, where this cross element is completed. The final stroke in the word completes the letters "her," beginning at point 312 and ending at point 314.

As noted above, a word may include zero strokes. For example, a space between strokes in a flow may be considered by the system as an intentional blank space (e.g., an inter-word space in a flow) and may be represented on the display as a separate word having no strokes. Words also may have a width, e.g., the width of a bounding box surrounding their strokes. Words also may have styles, such as bold, underlining, italics, circled, struck-through, etc., much as in a text editor.

ii. Insertion Regions and New Stroke Assignment to Flows

Figure 7:
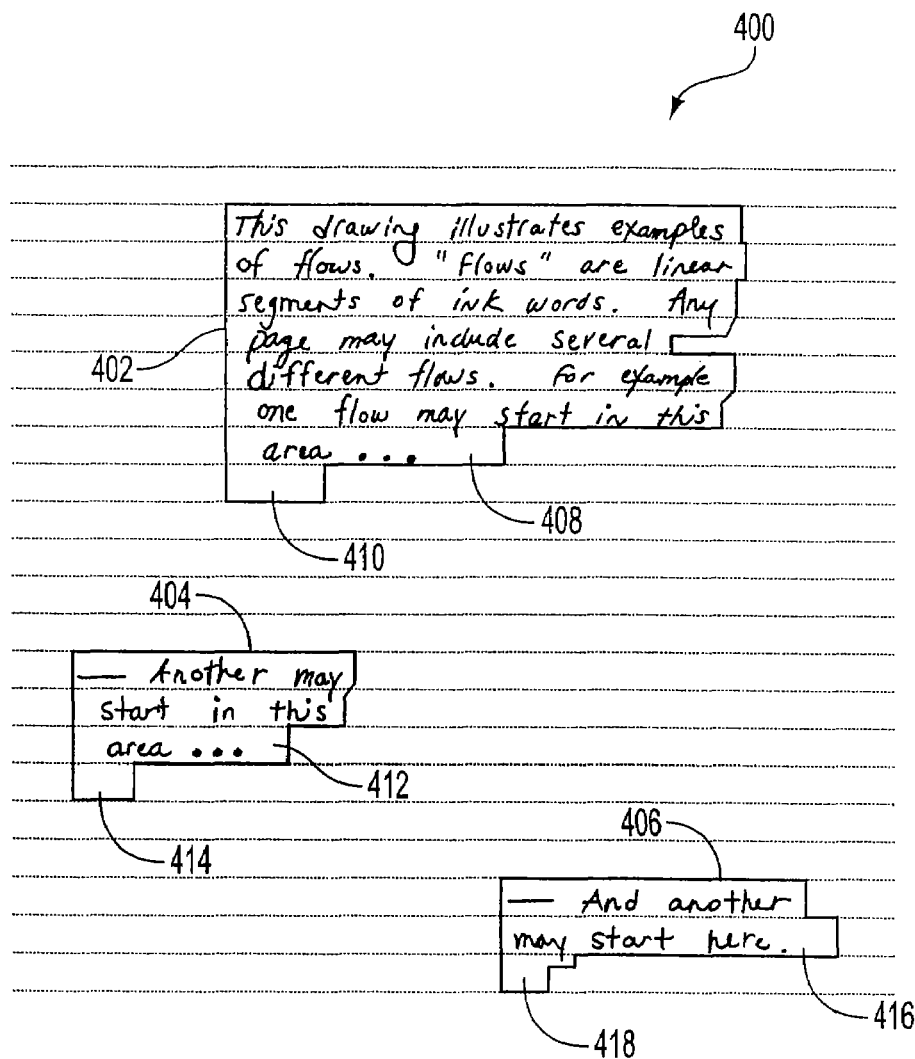
FIG. 7 illustrates flows of ink words as used in various aspects of the present invention.

FIG. 7 shows various flows on page template 400 as flows 402, 404, and 406. In general, a user may insert strokes at any location on the screen 400. For example, if a stroke begins and ends in an area on the page template screen 400 that contains no existing flows (also referred to as "unclaimed" space), and the new stroke never passes through space previously designated to belong to (or "owned by") an existing flow, then a new flow is started that contains the new stroke. For example, in FIG. 7, if only flow 402 was present on the page and the user began inserting the first ink strokes of flow 404, the system would recognize that the first stroke of flow 404 began and ended in unclaimed space. The system would also recognize that no existing flow owned the space on that line. Therefore, the system would recognize the first stroke of flow 404 as belonging to a new flow.

Systems and methods according to the invention also may determine whether a new stroke is intended to be associated with an existing text flow, for example, when a new stroke begins, ends, or at some point passes through an existing flow. Each existing text flow, at least when it is in the ink entry mode, may include at least two primary insertion regions. These insertion regions, in one example of the invention, are located immediately to the right of the last stroke of the flow (e.g., areas 408, 412, and 416 in FIG. 7), provided adequate space exists, and/or at the left hand edge of the flow in the line immediately below the line of the last stroke (e.g., areas 410, 414, and 418 in FIG. 7), again, provided adequate space exists. Note also insertion regions 272*a*, 272*b*, 274*a*, and 274*b* in FIG. 4. If the system or the flow is in the editing mode (discussed in more detail below), these primary insertion regions may not be provided or shown. Also, the locations of these insertion regions are based on writing that rasters left to right, then down. Other forms of writing are known (for example, Chinese) that raster top to bottom before any sideway movement. The location of the insertion regions is therefore considered discretionary based on at least the word or stroke orientation of a language.

If desired, the insertion regions may be shown to the user in a variety of ways including outlining the flows with additional area as shown in FIGS. 4 and 7 that highlights the insertion regions, providing the insertion regions in a different color or shading, and the like. Additionally, the existence of insertion regions may be hidden from the user, for example, if the user does not wish to see the insertion regions or when the insertion regions are not part of the active flow or when the flow is in the edit mode. Other modifications of how to show, when to show, and when not to show the various insertion regions are considered with the scope of the disclosure of FIGS. 4 and 7.

Figure 8:
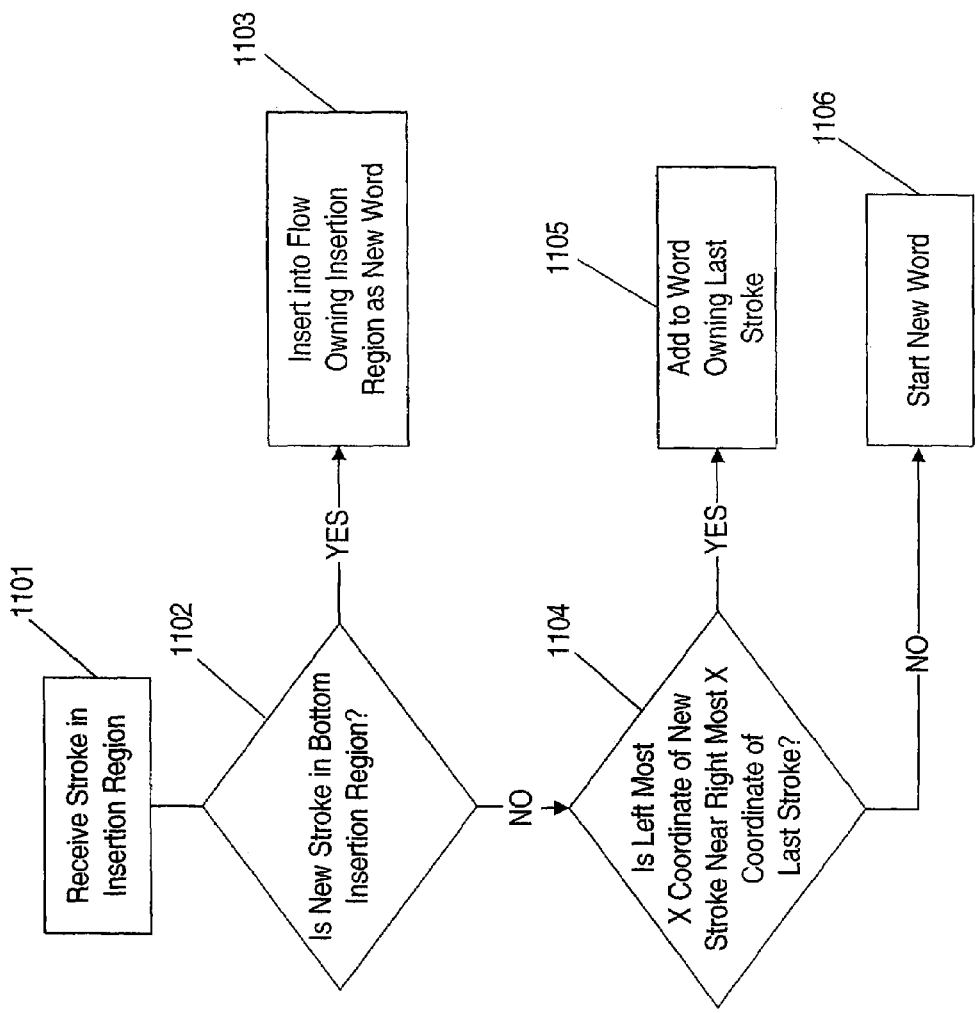
FIGS. 8-11B, 13, and 14 illustrate flow charts for various methods used in accordance with examples of the present invention.

New strokes need to be assigned to flows. Also, the strokes need to be assigned to the proper location within the flow. The following, in conjunction with FIG. 8, provides an example of how strokes may be assigned to words in a flow when the new stroke is inserted in one of the insertion regions of the flow. In step 1101, a new stroke is received in an insertion region of an existing flow. In step 1102, the system determines whether the new stroke was located in the bottom insertion region (e.g., insertion regions 410, 414, or 418 of FIG. 7). If yes, then in step 1103, the new stroke is added to the flow owning the insertion region as a new word. If the determination at step 1102 is no (meaning that the right insertion region 408, 412, or 416 has been used), then the system determines in step 1104 if the leftmost X coordinate of the new stroke is within a predetermined distance from the rightmost X coordinate of the last stroke of the last word in the flow (e.g., within ten pixels or less). If yes, then the new stroke is associated with the existing last word of the flow in step 1105. Otherwise, in step 1106, the new stroke starts a new word in the existing flow. It is appreciated that steps 1102 and 1104 may be switched in order by checking to see if the right insertion region was used first, rather than the bottom insertion region for a flow.

When a new stroke is incorporated into an insertion region of a flow in a way that causes the space needed by the flow to expand (e.g., the new stroke extends beyond the insertion region), additional space for the flow is claimed from unclaimed space of the page. If the additional space needed is not available (e.g., because another flow already owns it or because of the page template edge), the new stroke may be erased and/or ignored and/or otherwise handled by the system.

Systems and methods according to various examples of the invention also may determine whether to assign new strokes to an existing flow or whether to start a new flow for the new stroke in situations that are more complex. This determination may rely on some or all of the following information:
(a) the flow in which the stroke started,
(b) the flow in which the stroke ended,
(c) the (initial X-coordinate, average Y-coordinate) of the stroke (i.e., the average Y-coordinate is the average Y-coordinate of all the stroke's points),
(d) the size of the bounding box of the stroke, and
(e) the height of the stroke.

Figure 9:
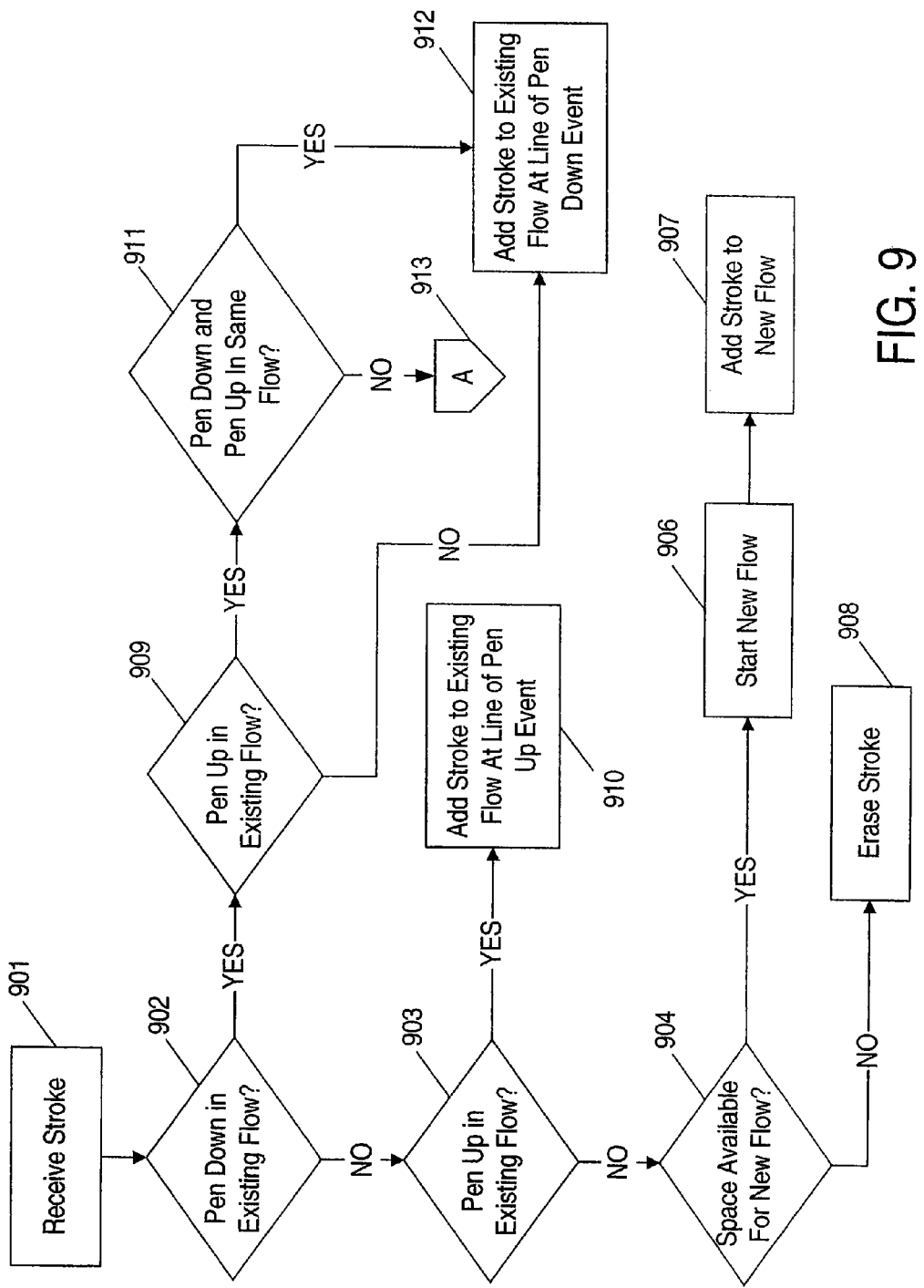
Figure 10:
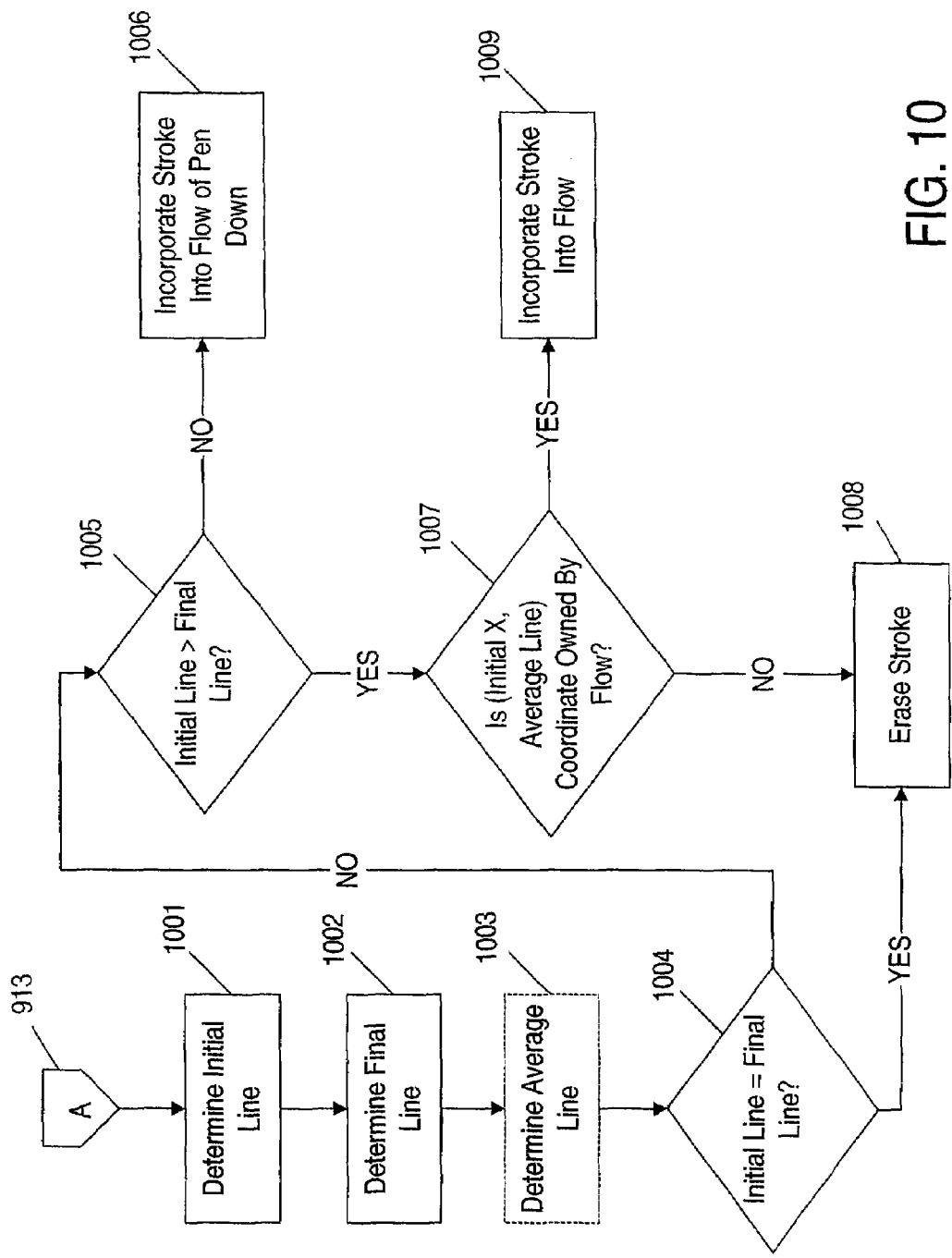
Figure 11A:
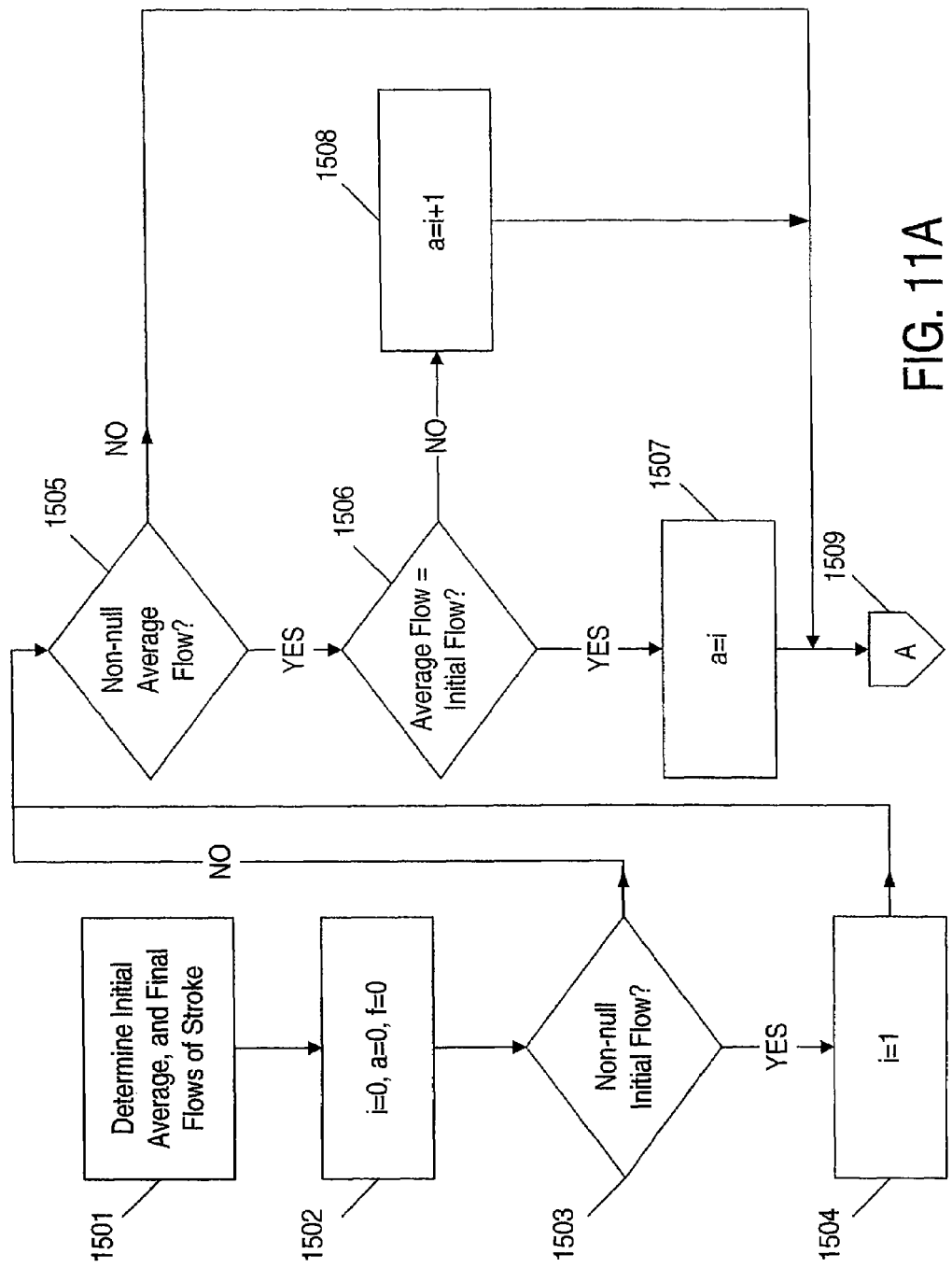
Figure 11B:
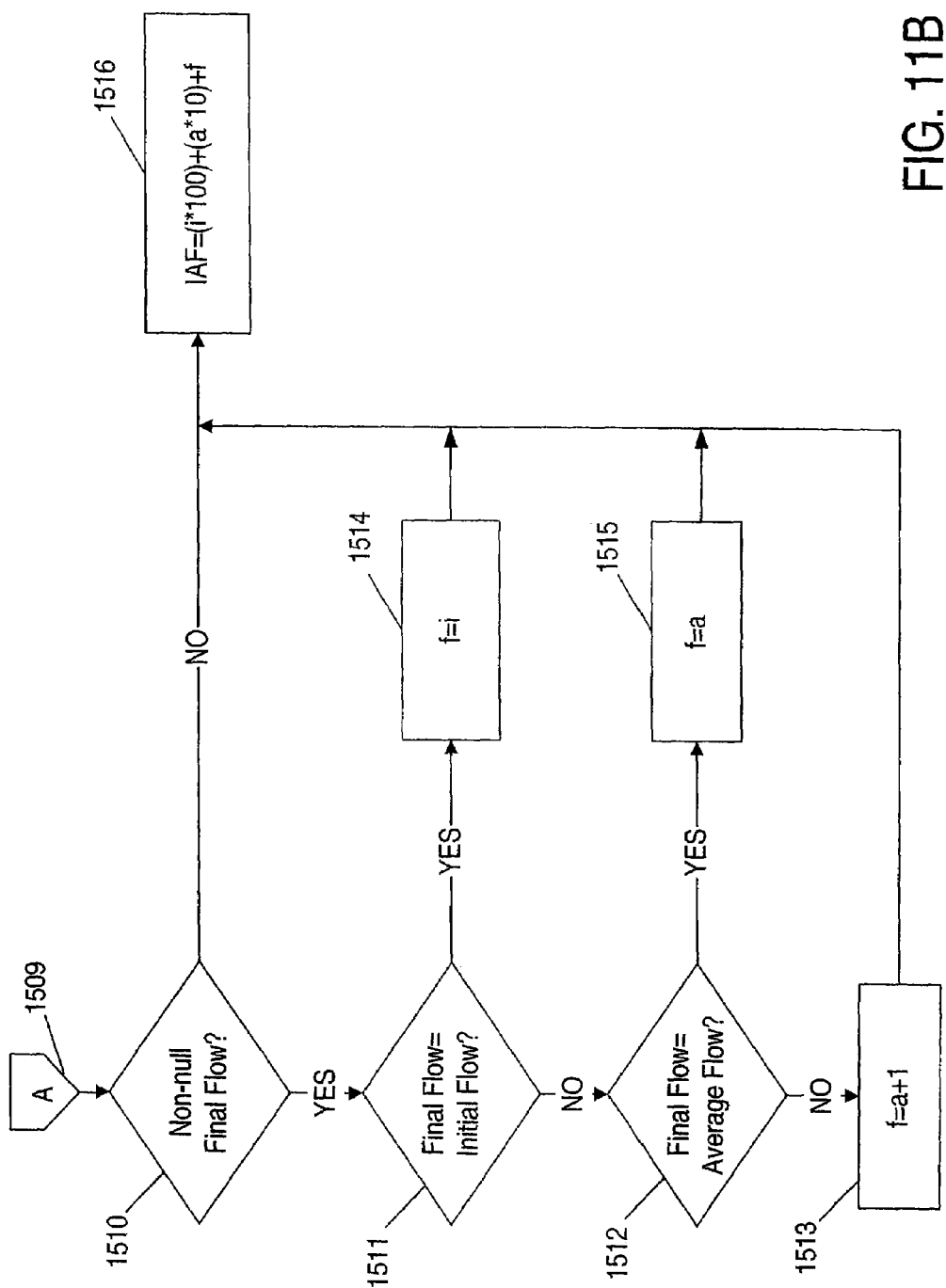

The flowchart of FIGS. 9 and 10 shows an example of the manner in which new strokes may be assigned to existing flows or new flows in accordance with some of these more complex situations.

A new stroke is received in step 901 of FIG. 9. The system determines whether a pen down event occurred with the pen location within an existing flow in step 902. If no, the system determines whether a pen up event occurred with the pen location within an existing flow in step 903. If no, then the system determines whether space is available for a new flow at the location of the pen down event in step 904. Alternatively, the location of the pen up event may be used. Also, the average line number of the stroke may be used (the average line number is the line 256 corresponding to the average Y coordinate of the stroke), e.g., to determine if an existing flow owns the needed space on the line.

If a new flow is to be started (step 906), any location within the stroke or near the stroke may be used as a location to place the new flow, and the new stroke is added to the new flow (step 907). The location of the new flow may be quantized to one of the lines 256. This quantization provides the user with clearer text alignment for a received flow.

If insufficient space is available for a new flow, the stroke may be erased in step 908. This provides immediate feedback to the user that the present stroke cannot be placed in a new or existing flow. Other appropriate ways of handling this stroke may be used without departing from the invention.

If the pen up event of step 903 occurred with the pen location in an existing flow, the new stroke is added to the existing flow at the line of the pen up event in step 910, and this flow claims any additional space needed for the new stroke from unclaimed space.

If the pen down event of step 902 occurred with the pen location in an existing flow, the system determines if the pen up event occurred with the pen location in an existing flow in step 909. If no, then the new stroke is added to the flow of the pen down event, and this flow claims any additional space needed for the new stroke from unclaimed space (if possible). In the case where multiple lines are used to represent a flow, the location of the new stroke is the location of the line of the pen down event as represented by step 912.

If the pen down and pen up events occurred within existing flows, the system determines whether the pen up and pen down events occurred within the same flow (step 911). If yes, then the stroke is added to the existing flow at the location of the pen down event (step 912). If the stroke had pen down and pen up events occur with the pen location in different flows, the system determines which flow should own the new stroke. The link to the next flow chart (FIG. 10) is shown by link 913 in FIG. 9.

FIG. 10 shows one example of a process for handling strokes that start in one previously existing flow and end in another previously existing flow.

In steps 1001 and 1002, the initial line and the final line of the stroke are determined. The initial line is the line 256 corresponding to the location of the pen at the pen down event, and the final line is the line 256 corresponding to the location of the pen at the pen up event. The average line of the stroke may be determined in step 1003. Step 1003 is shown in broken lines, as this step may be needed only as an input to step 1007. Accordingly, the determination 1003 of the average line of the stroke may occur anywhere prior to step 1007 and optionally only if step 1007 is needed.

Next, in step 1004, the system determines whether the initial line is the same as the final line. This may signify that the stroke bridges two juxtaposed flows, which this example of the invention will not permit. If so, the stroke is erased in step 1008. Erasing the stroke in step 1008 provides immediate feedback to the user that the stroke was not recognized, and it permits the user to rewrite the stroke or take other appropriate action. Other suitable ways of handling this situation can be provided without departing from the invention.

If the initial line and the final line of the stroke are different lines, the system determines in step 1005 whether the initial line is lower on the page than the final line. For Y coordinates that increase as one moves down a page, this determination may be represented as "initial line>final line?" If the initial line is higher on the page than the final line, then the stroke is incorporated in step 1006 into the flow of the coordinates at the pen down event.

If yes at step 1005 (the initial line is lower on the page than the final line), the system determines whether the user started the stroke on a line lower than a desired line. This determination at step 1007 checks to see if the X coordinate of the pen down location and the average Y coordinate or line of the stroke (for example, the point (Initial X, Average Line) or (Initial X, Average Y)) is owned by a flow. If yes, the stroke is incorporated into that flow in step 1009. If not, the stroke is erased in step 1008. Alternative processes may occur in step 1008 as mentioned above.

It is appreciated that the greater than and effective less than determination in step 1005 (less than as less than is the remaining option after step 1004) may be switched based on the numbering system of the digitizer. For example, if the Y coordinates of the digitizer were set so that moving up the page yielded increasing Y values, the various determinations may be switched and have the same effect as described. Also, the various determination steps 1004, 1005 and 1007 may be altered in order of occurrence as desired, and such alterations are considered within the scope of the illustration of FIG. 10.

Using this procedure, the described exemplary method properly addresses the situation where a person begins cursive writing slightly below the baseline on which he intends to write. An alternative approach would be to determine the flow based solely on the pen up and the pen down events. In this alternative example, while the logic would be simpler, there is an increased chance that the stroke would be assigned to the wrong flow.

iii. Non-Insertion Region Use

Figure 14:
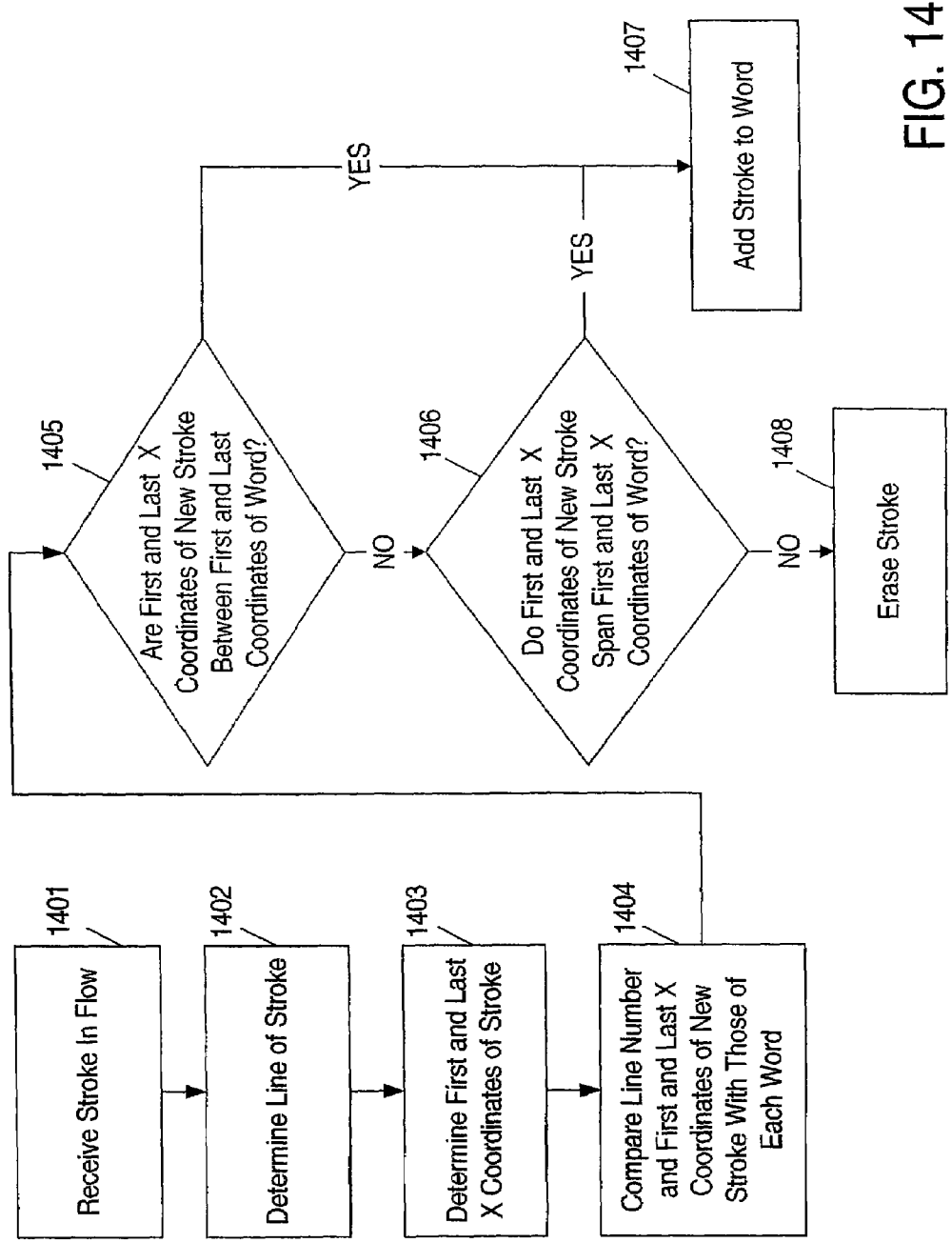

If a new stroke begins or ends in an existing flow but not in one of the insertion regions discussed above, the following example procedure may be used to assign the stroke to a flow. Referring to FIG. 14, in step 1401, a stroke is received that was written in an existing flow. In step 1402, the line of the stroke is determined. In step 1403, the first and last X coordinates of the new stroke are determined. (Alternatively, the farthest left and farthest right X coordinates of the stroke may be determined.) In step 1404, the line number and the X coordinates of the new stroke are compared with the line and X coordinates of each word of the flow successively. The comparison may be ordered from the beginning of the flow to the end of the flow or from the end of the flow to the beginning of the flow. Further, alternative searching procedures are possible and considered within the scope of FIG. 14, including starting with the words on the same line as the line of the new stroke then moving up and/or down from that line and the like.

In step 1405, the system determines whether the stroke's X coordinates are between the X coordinates of a word on the same line of the stroke. If yes, then in step 1407, the stroke is added to that word (e.g., crossing "t's" or dotting "i's"). If no, then the system determines in step 1406 whether the X coordinates of the new stroke span the first and last coordinates of the word. If yes, the stroke is associated with that word in step 1407 (e.g., circling or underlining). If not, the stroke is deleted in step 1408. Alternatively, instead of deleting the stroke in step 1408, other appropriate action may be taken. As another alternative, the new stroke may be associated with (added to or merged with) the first word on the line of the new stroke where the stroke "intersects" an X-coordinate boundary of an existing word.

In some examples of the invention, a new stroke may be incorporated into an inter-word spacing within a flow (i.e., a word with no strokes) by writing the new stroke completely within the span of the space. When this occurs, the system may automatically modify the flow to replace the original space with a leading space, the new stroke (which becomes a new word), and a trailing space.

iv. An Example of Assigning Strokes

FIGS. 11A, 11B, 12, 13, and 14 illustrate another example of assigning strokes to flows used in some systems according to the invention. In general, when the user enters a stroke, the stroke is first assigned to a flow (or a new flow is started), and then it is assigned to a word within the flow (or a new word in the flow is started). The assignment of the stroke to a flow in this example takes into account the flow that owns the space where the pen went down, the flow that owns the space where the pen went up, and the flow that owns the space at the (initial X-coordinate, average Y-coordinate) point of the stroke.

When assigning a stroke to a flow in this example, the starting and ending X-coordinates of the pen are only used to determine (by querying the page grid) the flow(s) in which the pen went down or up. Once the stroke has been assigned to a flow, the X-coordinates have more importance. The reason for also considering the flow owning the space of the (initial X-coordinate, average Y-coordinate) point of the stroke is that even though users know that they are supposed to "write neatly between the lines," few actually do. They start characters below the baseline or end them on the previous or next line, and display many other idiosyncrasies. The algorithm described here, in conjunction with FIGS. 11A, 11B, 12, and 13, deals explicitly with all possible combinations of a stroke's relationship to one or more flows, and seems to handle unusual situations quite well.

There are fifteen cases handled by the following exemplary method, depending on the flow in which the pen went down (the "initial flow" or "I" number, if any), the flow in which it went up (the "final flow" or "F" number, if any), and the flow of its (initial X-coordinate, average Y-coordinate) point (the "average flow" or "A" number, if any). In the following description, reference "0" represents null or unclaimed space, reference "1" represents the first non-null flow encountered by the stylus during the stroke (if any), and similarly references "2" and "3" represent the second or third non-null flows encountered by the stylus (if any). The fifteen situations potentially encountered by each stroke may represented by the following "IAF" numbers:

000, 001, 010, 100, 101, 110, 011, 111, 012, 102, 112, 121, 120, 122, and 123.

As an example, IAF number 102 means that for the stroke being considered, the stylus went down on the page template in flow 1 (the "initial flow" is flow 1), the flow of the (initial X-coordinate, average Y-coordinate) point of the stroke is unclaimed or null space (flow "0"), and the stylus went up from the page template in flow 2 (the "final flow" is flow 2, which is different from flow 1). For each case, the systems and methods according to this example of the invention decide: (a) to which flow the stroke belongs, or (b) to begin a new flow, or (c) that the new stroke cannot be assigned to a flow.

First, as illustrated in step 1501, the initial, average, and final flows of the stroke are determined. To determine the IAF number relating to this stroke, first the individual "i," "a," and "f" values are set to 0 (step 1502). In step 1503, it is determined whether the flow of the pen down event is a non-null flow. If the pen went down in an existing flow, the "i" value is set at 1 (step 1504), and the procedure moves on to step 1505. If the pen went down in null or unclaimed space, the "i" value remains zero, and the procedure moves on to step 1505.

In step 1505, the systems and methods according to this example of the invention check whether the (initial X-coordinate, average Y-coordinate) point is located in unclaimed space or in an existing flow. If in an existing flow in step 1505, the systems check whether the average flow is the same as the initial flow (step 1506). If yes, the "a" value is set equal to the "i" value (step 1507), and if no, the "a" value is set to i+1 (step 1508). After the "a" value is set, the systems move on to the next flow diagram (FIG. 11B), as represented by point 1509.

If, at step 1505, it is determined that the average flow is in null or unclaimed space (answer "NO"), the "a" value remains 0, and the procedure moves on to the next flow diagram (FIG. 11B), as represented by point 1509.

In step 1510, the systems then determine whether the final flow is null or non-null. If null (answer "NO"), the "f" number remains 0 and the IAF number may be determined (step 1516). The IAF number may be calculated as a three-digit number in step 1516 using the following formula:

$$IAF=(100 \times i)+(10 \times a)+f$$

If the final flow is non-null in step 1510, the systems determine whether the final flow is the same as the initial flow (step 1511), and if so, the "f" value is set equal to the "i" value (step 1514). If the final flow is not the same as the initial flow in step 1511, the systems then determine whether the final flow is the same as the average flow (step 1512), and if it is, the "f" value is set equal to the "a" value (step 1515). If the final flow is different from both the initial flow and the average flow (i.e., the answer is "NO" at step 1512), the "f" value is set equal to "a+1" (step 1513). After the final "f" value is set in step 1513, 1514, or 1515, the IAF number is calculated as described above in step 1516.

Of course, the information ascertained through this algorithm may be determined in various different manners without departing from the invention, e.g., by changing the order of various steps, by determining an AIF, FAI, FIA number (or the like), by separately storing the "a," "i," and "f" values, etc. These variations are considered to be within the scope of FIGS. 11A and 11B.

Once the IAF number is determined, the systems and methods according to this example of the invention use this number to determine how to handle the incoming stroke represented by the IAF number. The variations are illustrated in FIG. 12. For example, as illustrated in FIG. 12, when the IAF number is 000, the new stroke was located in unclaimed space and is assigned to a new flow at the average line of the stroke (provided sufficient space exists). For IAF number 001, the pen went down in unclaimed space and the average coordinate of the stroke is in unclaimed space, but the pen went up in flow 1. In this instance, the new stroke is added to the final flow at the average line of the stroke (provided sufficient space exists). For IAF numbers 010, 011, 012, 110, 112, 120, and 121, as illustrated in FIG. 12, the new stroke is added to the average flow at the average line. For IAF number 100, the new stroke is added to the initial flow at the initial line if the final line of the stroke is lower on the page than the initial line. Otherwise, the stroke is added to the initial flow at the average line of the stroke (in this manner, the algorithm properly assigns a comma to the correct line of a flow). For IAF number 101, the stroke is added to the initial flow at the initial line. For IAF numbers 111 and 122, if the final line is lower on the page than the initial line, the stroke is added to the initial flow at the initial line; otherwise, the stroke is added to the average flow at the average line.

IAF numbers 102 and 123 represent somewhat unusual situations where strokes pass through two flows and unclaimed area (IAF 102) or three different flows (IAF 123). In these situations, it is difficult to predict which flow the user intended to use, or if the user intended to start a new flow. Therefore, systems and methods according to this example of the invention erase and/or ignore the stroke. This provides the user with immediate feedback that the stroke was not recognized or was not assignable. Of course, such strokes could be handled in other appropriate ways without departing from the invention.

Appendix A provides code corresponding to one example of determining the IAF number for a stroke and for assigning that stroke to a flow (when possible).

Figure 13:
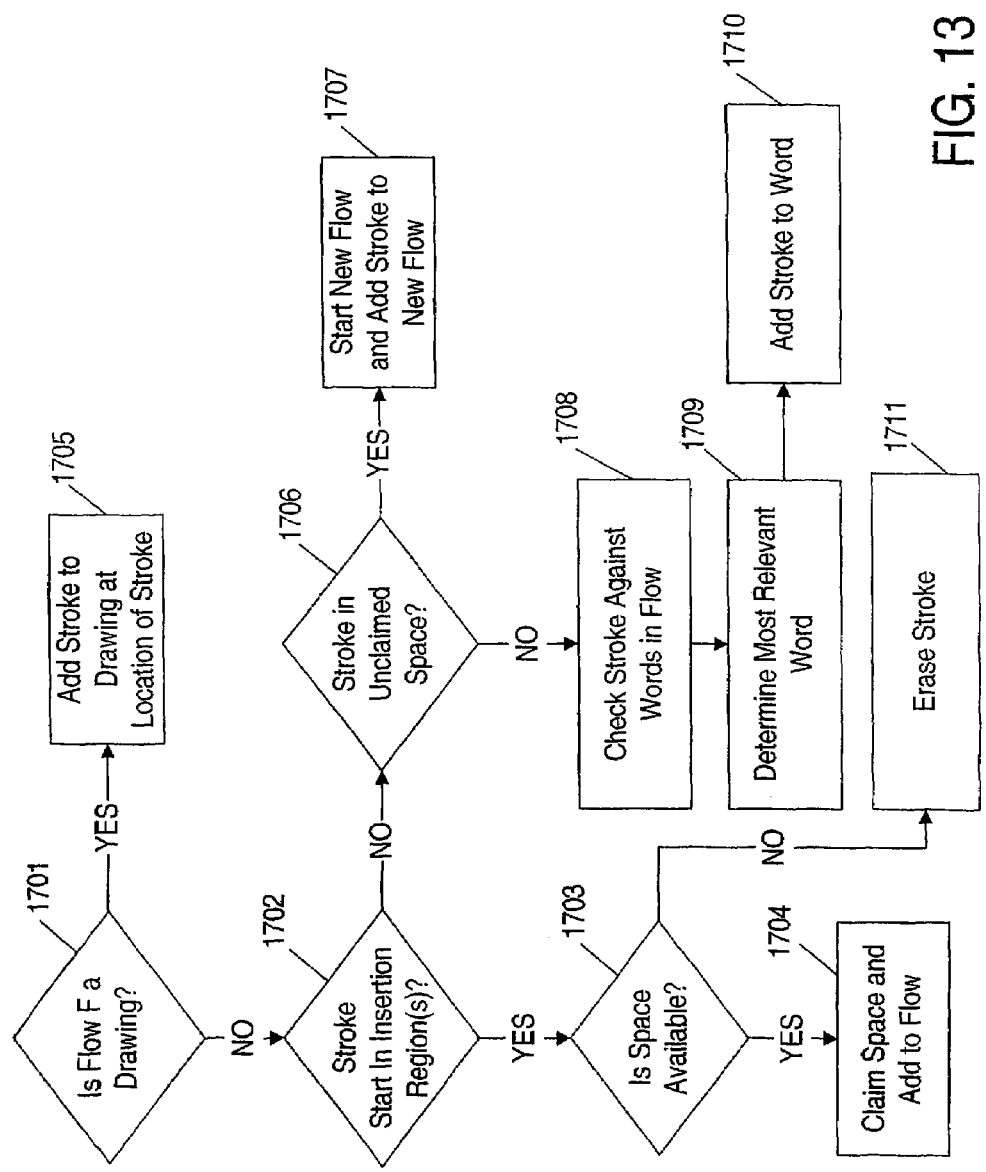

As noted above, systems and methods according to at least some examples of the invention add strokes to existing flows or start new flows, provided adequate space exists to take the necessary action. FIG. 13 is a flow diagram that illustrates one example of assigning strokes to flows and to words within flows according to the invention. First, in step 1701, the systems and methods determine whether the stroke is located within a drawing flow. If so, the stroke is added to the drawing flow at the location of the stroke (step 1705).

If the stroke is not in a drawing flow, the systems and methods next check to determine whether the stroke starts in an insertion region of the flow (step 1702). If not, the systems and methods next check whether the stroke is located in unclaimed space (step 1706). If yes, a new flow is started and the stroke is added to the new flow (step 1707). If no, the new stroke is checked against the existing words in the flow (step 1708). When the most appropriate word is located (step 1709), the new stroke is merged or associated with that word (step 1710).

If, in step 1702, it is determined that the stroke started in an insertion region of an existing text flow, the systems and methods then determine whether space is available to accommodate the new stroke (step 1703). If not, the new stroke is erased (step 1711), which provides immediate feedback to the user that the stroke could not be assigned to the existing flow. Of course, these situations can be handled in a different manner without departing from the invention. If space is available for the new stroke at step 1703, any necessary space for the new stroke is claimed from unclaimed space, and the new stroke is added to the existing flow (step 1704).

The following describes various methods and procedures that may be used with the exemplary procedure described in FIG. 13. A procedure called "setup" first tries to add the new stroke to an existing flow (e.g., flow f). One example of code for this "setup" procedure is shown in Appendix B. First, the procedure checks whether the flow is in an ink receiving mode and whether it is a drawing flow or a text flow, as described above. For the text flow case, the procedure calls a method named "addStroke." Note that various routines described herein return a Boolean indicator (named "ignoreStroke"), which indicates whether the attempt to add the new stroke to the flow was successful. If the attempt fails (ignorestroke=true), the top-level routine in this example erases and ignores the stroke. If the stroke can be added to flow f, flow f is activated (to receive ink), and the other flows are deactivated.

The "addStroke" method tries to add the stroke to flow f. First it checks whether the stroke started in one of the designated insertion regions (i.e., at the right end of the last line of the flow ("IR0") or at the left edge of the next line of the flow ("IR1")). If it did, a new word is created for the stroke or the stroke is added to the last word of the flow (depending on how close the new stroke is to the last stroke of the flow), provided that the flow can claim the necessary space from the page grid.

If the stroke did not start in one of the insertion regions, "addStroke" next tries to add it to one of the existing words of the flow, beginning with the last word and moving through the flow's list of words backwards. The test for determining whether the new stroke should be included in an existing word is done by a method named "intersects." If the "intersects" method succeeds (i.e., the new stroke intersects an X-boundary of an existing word), the new stroke is "merged" into that word. Because an inter-word space is considered to be a word having zero strokes in this example of the invention, the new stroke also may be "merged" into an existing inter-word space, in which case the systems and methods according to this example of the invention also may automatically add a leading and/or trailing blank space to the new stroke.

Appendix C provides code corresponding to one example of an "addStroke" method useful in one example of the invention.

In the "intersects" method according to this example of the invention, a new stroke is considered to "intersect" a word if it is on the same line as the word and (1) if its left or right end is within the span of the word or (2) if it completely straddles the word. The new stroke is assigned to or merged with the first existing word located that fulfills these intersecting conditions. To "intersect" an inter-word space, the new stroke must fall completely within the space. An example of code for this "intersects" method can be found in Appendix D.

Finally, when it is determined that a new stroke should be merged with an existing word in the flow, the systems and methods according to this example of the invention call a "merge" method. When the new stroke is added within an existing inter-word spacing, the new stroke is added to the space. There is no problem with claiming space in this situation because the space is already owned by the flow. As noted above, the stroke forms a new word, and the original inter-word space is replaced by three words, namely a leading space, the new word (new stroke), and a trailing space. The total width of the new word is equal to the original space's width.

When merging a stroke to an existing word, the stroke may make the word wider. For this reason, the systems and methods according to this example check that the additional space (if any) is claimable by the flow and, if so, set new left and/or right coordinate boundaries for the merged word and add the stroke to the word. While the word spacing for the newly expanded word is not changed until the next reflow operation, it may be desirable in systems and methods according to this example to shrink adjacent space at the new word's right side. Otherwise, another new stroke added near the end of the newly widened word could be claimed (incorrectly) by the adjacent space.

An example of code for the "merge" method can be found in Appendix E.

b. Editing Mode i. Operations

Another operational mode is the "editing" mode. In the editing mode, a user may modify the ink or text words deposited in the inking mode. In this mode, the stylus performs user interface control functions and generally does not emit ink. A user may perform numerous editing functions like those known in existing text editor systems including, but not limited to, cutting, pasting, bolding, underlining, italicizing, coloring, shading, un-deleting, undoing, etc. Some or all of these functions may be activated, for example, through the use of context menus.

1. Reflow

When a text flow is edited (e.g., by deleting a word or space, or opening up a space to insert a word), the flow may be reorganized and redisplayed on the page. This reorganization of the layout of the flow is referred to as being "reflowed." In various examples, reflow is confined to only affect a selected or active flow. In this manner, adding or deleting words or strokes to a flow affects the size of the active flow without modifying any of the other flows on the page. In an alternative example, all flows may be reflowed. However, this latter reflowing of all flows may cause confusion to users. Finally, in yet another example, some reflowing or repositioning of neighboring flows to correspond to that of a selected flow may be provided to adjust for layouts of flows. For example, two short flows may border on the left and right side of a long flow. By adding more words to the long flow, the long flow is reflowed, making it even longer. Using the third example of reflow, one or both of the juxtaposed short flows may be reflowed, or in the alternative moved, to lessen the amount of reflow needed for the long flow or to maintain the locations of the short flows with respect to a specific stroke or word in the long flow.

FIGS. 15A through 15D illustrate reflow procedures useful in certain examples. These figures are explained in more detail below with respect to the opening space and normalization functions. In general, a user may request that an active flow be reflowed (e.g., by activating an appropriate tool on a toolbar (e.g., button 260 in FIG. 3)). The toolbar is shown in broken lines in FIG. 3 to accent the fact that this toolbar is but one example of a manner in which functional tools may be provided in systems and methods according to the invention. When an active flow is "reflowed," all space owned by the active flow is released, and the words and strokes of the flow are reconstructed. When reflow occurs, the user may determine the starting location of the flow and/or the desired width of the reflowed text. Alternatively, or as a default, the system may automatically set the width of the reflowed text to that of the first line of the flow. During reflow, the words and strokes of the flow are reset, starting at the first line and upper left corner of the flow at the desired location. As each successive word of the flow is rendered, the system tries to claim the space needed from unclaimed space on the page template within the set width on the line 256. If sufficient space exists on the line, the word is located to the right adjacent the immediately preceding word. If another flow owns at least some of the desired space, the systems and methods according to this example attempt to set the word on the next line at the left edge of the flow or to the immediate right of any other flow on that line. The result is that the words of the reflowed text flow around any existing but inactivated flow on the page. Using this process, the resulting reflowed text is left justified to the extent possible (i.e., avoiding overlap of any existing flow). However, alternative justifications are equally possible including full justified, center justified, and right justified and are considered within the scope of these examples of reflow. These alternative justifications may be achieved by adjusting the inter-word spacings in a flow and the locations on a page for each flow.

By providing flows and encouraging users to use them to organize disparate items within a single page, the results of reflow may be confined to a single flow and predictable. When the user needs to open up space in a flow in this example of the invention, only that flow is changed. Other flows do not move. In addition, since reflow is efficient, the results can be displayed in real time as the user moves the pen, reducing surprising behavior of the display device.

2. Open Space/Close Space/Normalize

FIGS. 15A through 15D illustrate other features that may be available with methods and systems according various examples. One illustrated feature is a space tool (which may tie to button 264 of FIG. 3 or may be a separate function tied to a gesture, a "soft" button, a context menu item, or other means for initiating the space tool). The ability to open up space on a page to insert more text is a desirable and powerful feature for pen-based computing system products. The use of flows, as described above, makes the ability to open up space in a document even more useful and predictable.

In other systems where flows are not used, opening up space often leads to confusion, as an entire page will be reflowed below the opened up space. While this may be appropriate for a page that contains a single flow of text, a page containing multiple sets of notes at parallel portions of a page may become quite confused if full page reflow is all that is available (as noted above, when taking notes, users tend to write at various different locations on a page). Confining the space tool operations to a single active flow may avoid these surprising and unpredictable results.

Figure 15A:
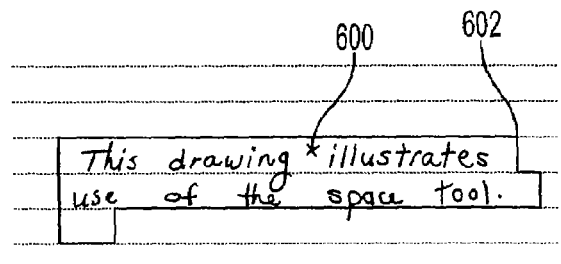
FIGS. 15A through 15D illustrate opening and closing space in accordance with aspects of the present invention.

To open up more space in an active flow 602 in this example, a space tool is activated (e.g., by tapping button 264 or performing other action), and the user input device is placed on the page template, for example, at spot 600 illustrated in FIG. 15A. With the space tool activated (which may be shown by a cursor of different shape), the user may drag the input device to another location 606 on the page template, illustrated by the broken line 604 in FIG. 15B. This action claims more space for the active flow 602 and moves all of the words in the active flow 602 beyond and below point 600 and opens up the new open space. Once the new location 606 of the user input device is established (e.g., by lifting the user input device from the page template), the words originally located after point 600 are reflowed into the area beyond point 606.

Figure 15B:
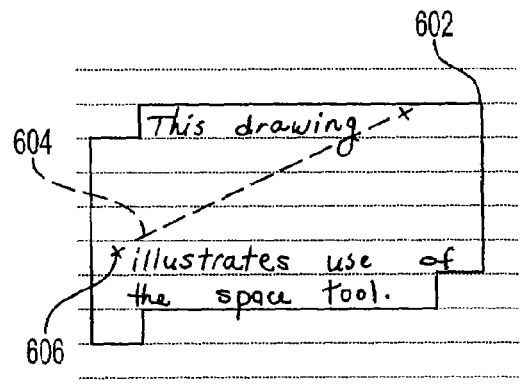

The space addition and reflow operations may take on many variations. For example, if as the user moves the user input device she crosses a line below the original line of text, two spans may be added to the flow. For example, the first span added might start at the original X coordinate of the word moved and extend to the right edge of the flow. The second span added may start at the left edge of the flow and insert blank space until the word moved appears at the same X coordinate as it appeared originally. Additional blank lines may be inserted, depending on how far downward the space is opened on the template. Alternatively, as illustrated in FIG. 15B, the new position of the first word moved may appear directly at the location where the user input device is lifted from the page template.

Once the space has been inserted, the user may add additional text into the flow. If desired, the system can be set up to automatically enter the ink entry mode after the space inserting stroke has been completed (dashed line 604 in FIG. 15B). In the illustrated example, as illustrated in FIG. 15C, the word "series" has been added between the words "drawing" and "illustrates." The entire opened up space may be used as an area in which ink can be entered.

The space tool works by reflowing the words of the active flow as the pen is dragged. This method locates the element of the flow that is under the pen, and adjusts the size of surrounding space (or adds new space) to the flow such that the element being dragged will remain under the pen after reflow. The result is that at all times the page appears as it would should the pen be lifted.

Because this space opening procedure in this example does not modify the width of the flow's space, the space added remains when the pen is lifted. The user can write in the added space. Because each word of a flow has a defined length or boundary, the horizontal space it occupies on the line is known. This makes reflow quite simple and straightforward, using a simple line-filling algorithm to fill the flow's width.

Figure 15C:
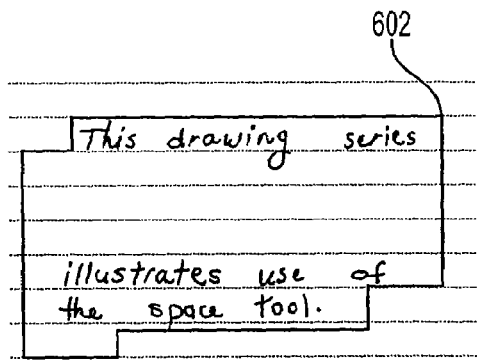
Figure 15D:
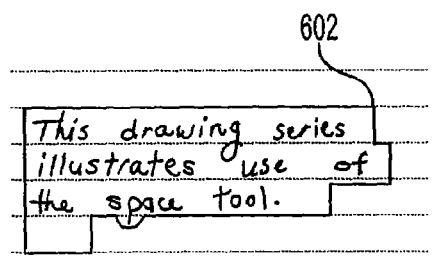

A comparison of FIGS. 15C and 15D illustrates another feature that may be included in examples of the invention. These figures show a normalization feature. At any time, including after the space tool feature has been used, a user may activate a normalize feature, e.g., by tapping normalize button 266 in FIG. 3 or in some other manner. When activated, this function adjusts the spacing between adjacent words in an active flow to a predetermined length. During normalization, all space encompassed by the flow is released, and the words of the flow are reflowed to a desired flow width, which may be freely set by the user, with a consistent spacing provided between adjacent words. For example, as illustrated in FIG. 15C, the spacing between adjacent words varies. After the normalize tool is called upon, however, the inter-word spacing is automatically adjusted, as shown in FIG. 15D, so that the inter-word spacing is consistent throughout. If any line does not contain enough space to accommodate the next adjacent word of the flow, the next word is placed on the next line below, if there is adequate space in the next line that is not claimed by an existing, inactive flow.

In general, reflow differs from normalization in that reflow does not change the width of the inter-word spaces in the flow. Normalization, on the other hand, replaces all inter-word spaces with spaces of fixed width in the X coordinate direction. Normalization may assist in formatting when it applies various rules including that all words are to be separated by a space and that a line cannot start with a space (it left justifies the flow).

3. Other Features

Methods and systems according to various examples of this invention also may provide simple ways of handling unexpected actions or errors. For example, as noted above, if a new stroke is not properly recognized or assignable to an existing flow or a new flow, the described examples may be set to erase and/or ignore the stroke. This gives the user immediate feedback that the system could not assign the newest stroke to a flow. Additionally, by visually identifying the present flow to which strokes are being added (e.g., via a colored border or in some other way), the user can immediately recognize where the new strokes are being inserted. If the new stroke is inserted into the wrong flow or incorrectly starts a new flow, the user may recognize this fact and take appropriate corrective action (e.g., delete the new stroke and re-write it in the correct flow). As noted above, the systems and methods may use other ways of identifying and dealing with unrecognized or unassignable strokes without departing from the scope of the invention.

Dragging the first word of a flow using the space tool may be treated in a somewhat different manner in various examples of the invention. When the first word is dragged, the entire flow may be moved on the page template to follow the first word. The other words of the dragged flow rearrange themselves to avoid any other flows existing on the page. If the user attempts to drag the first word to a location occupied by another flow, the cursor may change shape and further dragging may be prohibited. If the user input device is lifted when the flow is located in an improper position (e.g., in a position occupied by another flow), the flow will return to its original position prior to dragging (as another alternative, the system may be set up to merge the two flows or to ask the user if merger is desired). In this example, the systems and methods may be set up to either open up new space in the flow before the first word or to simply move the entire flow without opening space or either action, depending upon the user's instructions or the system set up. Also, dragging the last word of the first line may be used to adjust the flow's column width, in some examples of the invention.

The systems and methods according to examples of the invention may allow the user to change the characteristics of the user input device and/or the representation of the ink on the page template (e.g., ink line width, ink color, etc.). The user may freely change these pen and ink characteristics within each flow and/or from flow to flow.

The following describes examples of additional features or functions that may be included in some systems and methods according to the invention. For example, in the editing mode, a user may tap on a word to set an insertion point, or drag the input device to select one or more words. In both instances, a context menu may appear that indicates available editing options for the selected words (e.g., copy, cut, underline, bold, italics, etc.). This context menu may be programmed to disappear if the user does not tap an entry within a few seconds. At the insertion point, the user may insert a special character that controls the formatting of the flow (e.g., a carriage return ("CR"), which starts a new line; a bullet point, to start a bulleted listing (which also starts a new line); etc.).

When a single word is selected, one of the available editing options may be to break the word. This option is offered for instances when there was almost enough space between strokes of a word to treat it as two words (e.g., if the user intended to write two words but wrote too close together such that the system treated the two words as one word). As other possible editing options, if the space between two words is selected, the system may allow the two words to be merged together (e.g., if the user intended to write one word but wrote too far apart such that the system treated the one word as two words), or it may allow the user to add a carriage return and/or a bullet. Getting the word breaks correct may improve the accuracy of the handwriting recognizer, should the user decide to convert the handwritten text to machine-readable text.

If one or more words are selected in the editing mode, one option offered by the context menu may be "convert to text." If the user taps on this option, various examples of the invention may be designed to attempt to recognize the handwritten ink words and place the text words in a scrollable text box pop-up 740, like that illustrated in FIG. 5. The text box 740 may be accompanied by a soft keyboard 284 (e.g., a text input panel or TIP) and/or a list 742 of possible alternatives for unrecognized text, which allows the user to select text or an insertion point in the text and make corrections, like a normal text editor would function. When the user finishes making any desired changes, the ENTER key may be tapped on the soft keyboard 284 to apply the corrections to the text version of the writing (notably, the text flow itself may or may not be changed to show the text words, depending on the system design). Tapping ENTER also may be used to place the revised text in the system clipboard, which would make it available for pasting into another application. Tapping outside the text input panel 284 may be used to cause the panel 284 to disappear.

If desired, the systems and methods according to the invention may be designed so that the text input panel 284 can be called up by the user at any time, in either operational mode, e.g., by tapping a button, etc.

Additional options may be available for correcting the text representation of the ink words in the editing mode. For example, the user may select a single ink word by dragging on it. When the context menu pops up, its entries may provide alternative choices for the ink word (provided that the word has been recognized by the handwriting recognition software). Selecting one of the alternatives replaces the word (again, the text flow itself may or may not be changed to show the text words, depending on the system design). The user also may make changes or corrections by deleting the selected word or words, switching to ink entry mode, and rewriting the word or words in the space occupied by the original word or words. If necessary, the space tool may be used to open up additional space in the flow. When the rewrite is complete, new text may be selected (in editing mode) and a "convert to text" option may be selected so that the text recognizer may recognize the written text. As other options, this recognition may occur automatically at any desired time, or never.

ii. Techniques of Operation

1. Context Menus

Many editing functions in systems and methods according to some examples of the invention may be activated through context menus that automatically pop-up when certain action is taken. The context menu may provide a list of various functions that can be performed. For example, when in the editing mode, tapping on a word may cause a pop-up menu to appear that includes various options, such as break word, recognize handwriting, underline, italicize, copy, cut, bold, insert carriage return (before or after), insert bullet (before or after), etc. Similarly, tapping on a space between two words may cause a pop-up menu to appear with various options, like those mentioned above and/or others, such as merge words, etc.

Selecting text (e.g., by dragging the input device over several words when in the editing mode) also may cause a context menu to appear. Various options, like those discussed above, may appear as part of the context menu.

The context menus also may offer other options, such as dismiss menu, switch to ink entry mode, etc., show ink, show text, copy, and/or provide optional machine-generated text words to replace ink or text words in the flow. One example of a suitable pop-up context menu 282 is shown in FIG. 4. These menus may be programmed to disappear after a predetermined time period, if no command is selected.

2. Buttons

One or more editing functions also may be activated through the use of buttons. For example, as illustrated in broken lines in FIG. 3, a toolbar with buttons 258, 260, 262, 264, 266, and 268 may relate to functions also described herein including reflow, opening/closing space, switching modes, or other known operations including creating a new page, saving the page, delete, undo, un-delete, and the like. Other conventional editorial functions may be included in the pen-based computing systems according to the invention, similar to those present in existing word processing and text editing systems. Examples of various possible functions are described throughout this description.

c. Switching Between Operational Modes

Examples of the invention support one or more ways of switching between the editing and inking operational modes. Some examples are discussed above.

As other examples, a set of functional buttons may be provided. These buttons may be, for example, either physical buttons on the system or "soft" buttons displayed as part of the user interface. The displayed buttons may be placed in a toolbar along the top of the page template 252 (see FIG. 3) or anywhere else, as desired. Further, the buttons may be hidden and only displayed when desired, for example, when a stylus hovers over an edge of the display.

In the illustrated example of FIG. 3, button 258 may be an "edit/ink" toggle button, which allows the user to switch the active flow between the "edit" and "ink entry" modes. Once an operational mode has been set, intentionally or by default, the system operates in that mode until changed. In some examples of the invention, the operational mode must be actively changed by the user. However, automatic changes also are possible under certain circumstances, e.g., after the user uses the space tool, the system may automatically enter the ink mode, to allow text insertion.

i. Selection Based

One way of switching between operational modes includes affirmatively selecting one mode over others or toggling between operational modes. A selection-based operational mode entry switch has the advantage of actively involving the user in the switching operation, effectively minimizing unintentional switching between operational modes.

As one example, tapping the input device in an empty area of the page may cause a context menu to appear that allows the user to switch the active flow's operational mode. The context menu also may be brought up in the editing mode by selecting one or more words or strokes. The context menus can be design to disappear after short time (e.g., 2-3 seconds) unless a command is activated (by tapping) or unless the input device is hovering over the menu. One item that may appear in any or all context menus is a "dismiss" selection, which causes the context menu to disappear without making any changes to the flow. The context menus may be designed to show or highlight only the commands available to the user at that time.

ii. UI Selection

One way of switching between operational modes includes operation of a selection on a user interface. The selection may include a button (hard or soft), a toggle switch (hard or soft), and the like, as generally described above.

iii. Stylus

Another possible way of switching between operational modes includes operation of the stylus itself. For example, pressing a button on the stylus or flipping the stylus over and using the opposite end, similar to using an eraser on a pencil, is possible ways to switch between the operational modes.

iv. Alternative Switching

Other ways of switching between operational modes may include using predefined ink shapes to switch between modes, hovering for a predetermined amount of time or at a predetermined location, physically changing styli, and the like. If desired, systems and methods according to some examples of the invention may be designed to automatically recognize the new handwritten ink words at the time the edit mode is activated for a flow.

d. Stroke Operations

Various operations may be performed with strokes including stroke selection and stroke mark up. In general, users have a difficult time with the concept of handwritten ink at various portions on a page. Difficulties have arisen in which disparate flows are selected by using the typical raster selection technique used by conventional word processors (in which selection moves from left to right then down across a page).

i. Stroke Selection

In some examples of the disclosed system, selection is confined to the words (and/or strokes) in a single flow. By eliminating the inclusion of plural flows in a selection, a greater chance exists that what is selected is what a user intended to select. This is based on the relationship between words in a flow being more relevant to each other than to words in other independent flows. While any given flow may have a relationship with other flows, the selection process in some examples of this invention relates to the selection of the words or strokes in a single flow, not to various words or strokes from plural flows.

ii. Stroke Markup

In some examples of the disclosed system, a strong association between strokes that mark up a word is created. In other words, the markup stroke is combined with and stays with the word it marks up or modifies. In some examples, the markup stroke may be associated with more than one word (in the case of circling or underlining) so that the markups follow the words as a flow is modified.

2. Display Characteristics

The current mode (ink entry or editing) may be displayed to the user in a variety of ways including, but not limited to, depression of buttons, changing cursors (e.g., drawing, editing, inking, and others), color change, brightness change, contrast change, textually, and the like. Additionally, the presently active flow also may be displayed to the user in any suitable manner without departing from the scope of the invention, such as via the techniques identified above.

3. Mode Independent Operations

Some aspects of data or text entry may exist apart from the underlying operational mode. Examples of mode independent operations follow.

a. Space Tool, Reflow, Normalize

While the space tool, reflow, and normalize functions are described above as part of the editing mode, systems and methods of the invention also may be designed so that one or more of these functions may be activated in the ink entry mode as well.

b. Text or Ink Input Window

Another example of a potential mode independent operation relates to the availability of a text or ink input window. For example, a user may be editing a document in the editing mode and desire to add a word (in text or ink form). Rather, than switch out of the editing mode and into the ink entry mode, the user may request a text or ink input window to appear. The user then may input text or ink words into the window and then close the window with the resulting text or ink being placed at a specified insertion point. The insertion point may be specified before, during, or after operation of the text/ink input window. Alternatively, the system may include a fixed text/ink input area in which, though in the editing mode or any other operational mode, a user may write in the fixed area to enter text or ink.

B. Drawing Flows

In some examples according to the invention, drawing flows may be produced on the page template. Using the stylus, the user may draw pictures or other various shapes on the page template, and the systems and methods according to these examples of the invention will capture the drawing strokes in drawing flows. One aspect of drawing flows that distinguishes them from text flows is that the information entered in a drawing flow is not considered to relate to written words, so it will not be converted to text (e.g., by handwriting recognition software).

The user may start a drawing flow in any suitable manner without departing from the scope of the invention. For example, when a user desires to initiate a drawing flow, she could "inform" the system that a drawing flow is desired, e.g., by drawing a diagonal line on the page template that spans more than three vertical lines 256 (when in a text flow, strokes more than three lines high may be ignored, erased, or otherwise handled by the systems of the invention). This diagonal line then may be used by the system to define the opposite corners of a box containing the drawing flow. Once the dimensions of the drawing flow are established by the user's diagonal line, the system can then erase the diagonal line and eliminate the ruled lines for text in this drawing flow box, thereby providing immediate feedback to the user that this portion of the page constitutes a drawing flow, not a text flow. See, for example, drawing flow 270 in FIG. 4. Of course, other suitable indicators may be used without departing from the scope of the invention, such as color, shading, messages, etc. Additionally, other ways of "informing" the system that a drawing flow is desired can be used without departing from the scope of the invention. For example, the user could activate a button on the screen, on the computer, or on the stylus; the user could change stylus characteristics or physically change styli; etc.

Data entered in a drawing flow may be stored in a data structure different from that for storing ink or text words entered in a text flow. One advantage of using different data structures relates to improving the compressibility of the received data. For example, it may be possible to compress drawings more than ink words due to the need to preserve fine distinctions of strokes in ink words.

In some examples according to the invention, like text flows, production of drawing flows may include two distinct operational modes, namely, the "ink entry mode" and the "editing mode." These operational modes are discussed in more detail below.

1. Ink Entry

In the "ink entry mode" of drawing flows, the stylus may function exclusively or primarily as a data entry device and its exclusive or primary function is to emit electronic or digital ink. Strokes can be captured in any suitable manner. For example, stroke capture may be conducted in the same manner in drawing flows as in text flows, but in drawing flows there is no need to determine whether successive strokes should be associated with preceding strokes or preceding words. Additionally, as noted above, in drawing flows there is no need to attempt to recognize the strokes as words by handwriting recognition software.

Additionally, when working in a drawing flow, a user may begin a stroke or end a stroke outside the designated drawing flow box, or, at some time during the stroke, the user may stray outside the drawing flow box and return into it. Systems and methods according to the invention can handle these situations in any suitable manner. For example, the system could be designed to automatically expand the drawing flow box to accommodate the stroke, provided the additional space needed is available (e.g., when the additional space needed does not overlap with an existing flow). As another alternative, the system could inquire whether the user wished to expand the drawing flow box prior to doing so. If sufficient space is not available, the system may give the user an opportunity to move an existing flow or the new stroke, if doing so would provide sufficient space to expand the drawing flow box and/or otherwise accommodate the new stroke. As another alternative, the system could be designed to ignore and/or erase any part of or all of a stroke that extends outside the original drawing flow box.

In drawing flows, the user may wish to add ink at any location in the drawing flow box. Therefore, the entire drawing flow box may be considered an "insertion region," i.e., a region in the flow ready to accept new digital ink.

2. Editing Mode

Drawing flows also may be edited. Any suitable editing functions can be accomplished without departing from the scope of the invention, including, but not limited to selecting, cutting, erasing, copying, pasting, un-deleting, undoing, expanding the flow box dimensions (horizontally and/or vertically), etc.

Additionally, editing functions can be conducted on an individual stroke, plural strokes, or on portions of one or more strokes. For example, strokes may be shortened, lengthened, "pulled" in different directions or different shapes, moved to other locations, etc. Additionally, if desired, the system could be designed to insert various predetermined shapes or objects generated by the computer, such as lines, arrows, circles, squares, rectangles, triangles, and the like, and these shapes or objects may be further manipulated by the user, e.g., to add lines, change size, change locations, change colors, etc.

In drawing flows, the systems and methods according to examples of the invention also may include any suitable manner of switching between the ink entry and editing operational modes, and any suitable manner of indicating to the user the present operational mode. Examples of these techniques are described above in the text flow sections of this application.

IV. Data Structure

Various data structures may be used to store flows. For example, tables may be used with rows identifying the lines of a page and the columns storing information relating to flows and/or strokes. Alternatively, the data structure may include a linked list, linking one flow to the next. Further, the data structure may be a double linked list between flows. It is appreciated that a variety of data structures may be used to store flows. The data structures may be page-based, document based, or flow-based.

In one example of the data structure, a page grid structure may be used. A page grid separates flows so that flows do not overlap. A page grid may be a single-linked list of flows. A flow may be a double-linked list of words, and a word may be a singly linked list of strokes.

Each flow may have a starting coordinate composed of its line number and the X-coordinate on the line, as well as a desired width (which may be used during reflow to set the flow's column width). Words may include the bounding rectangle of their strokes, to allow fast hit-testing. Each stroke may include an array of points in the format needed to render the word (e.g., in screen coordinates, higher resolution raw digitizer coordinates, or both), as well as a stroke width and color. The stroke coordinates are recomputed whenever the stroke is moved.

Alternatively, all object coordinates may be represented as offsets relative to the object's container, so that moving words on the page is efficient. However, because words typically are drawn more frequently than moved, this alternative may result in reduced drawing efficiency.

Figure 16:
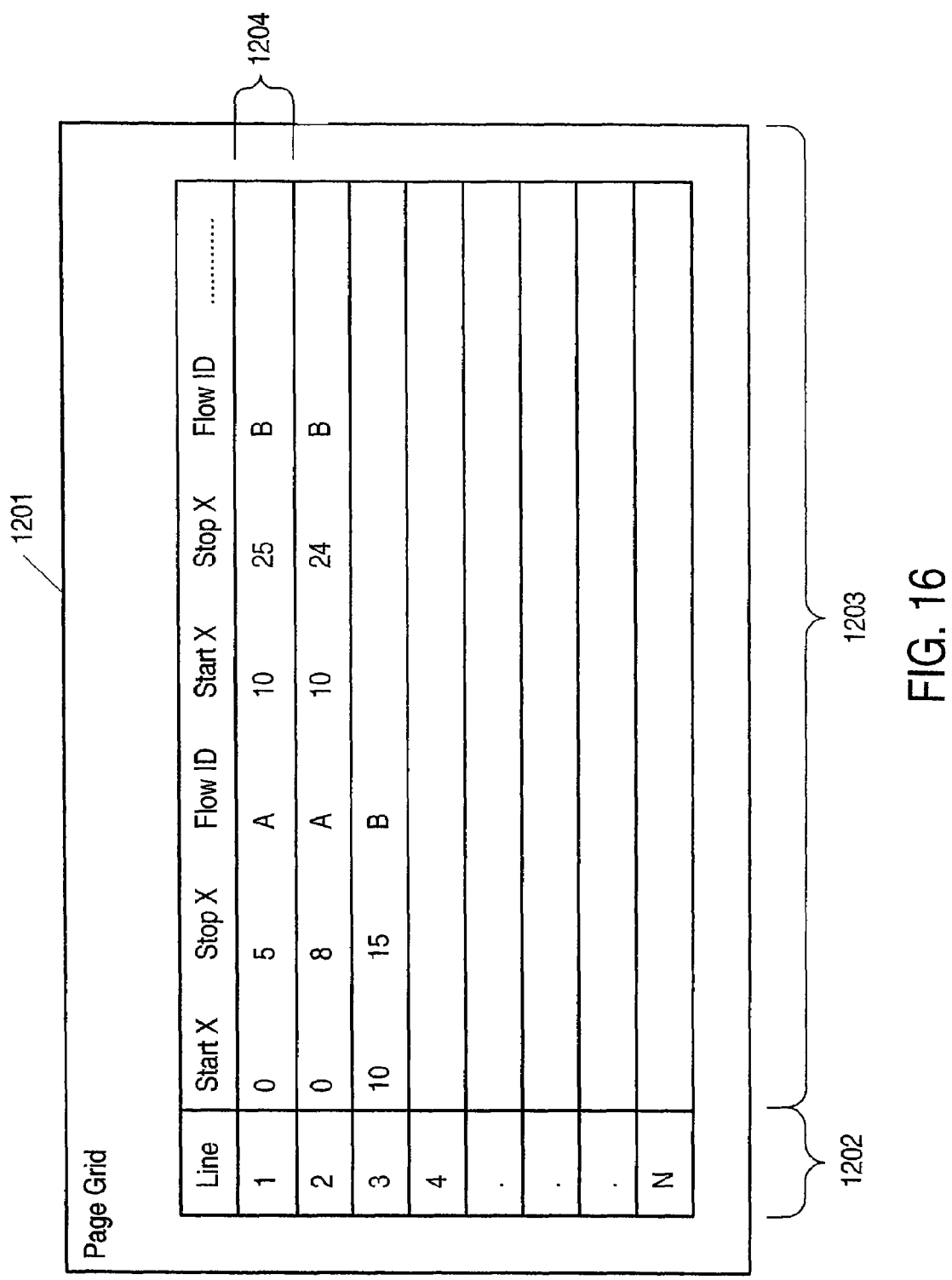
FIGS. 16 and 17 show various data structures in accordance with examples of the present invention.

A page grid, which is a data structure that represents a sheet of lined paper, keeps track of allocation of space on the page. The page grid includes one span per line 256 (see FIG. 3). Each span identifies a contiguous region on the line and the flow that owns that region. Referring to FIG. 16, a page grid 1201 is shown. In the page grid 1201, each line is represented by a number of spans 1203 (for example, span 1204) with a correspondence of one span per line. As shown in FIG. 16, N spans are present, one for each line of a page and identified by a span number 1202. If each page grid has the same number of spans, the line number identifiers 1202 may be eliminated. Alternatively, the number of spans may be limited to those spans with flows owning space in them. In this alternative example, as only spans relating to lines 1-3 have flows claiming space, page grid 1201 may be limited to only housing spans 1-3.

In FIG. 16, each line number is identified in 1202. The owned X coordinates of owned space for each line are shown as StartX and StopX with an identifier of the owning flow followed after the StopX. It is appreciated that any order of the flow identifier and the start and stop X coordinates may be used and are considered within the scope of the data structure of FIG. 16.

Figure 17:
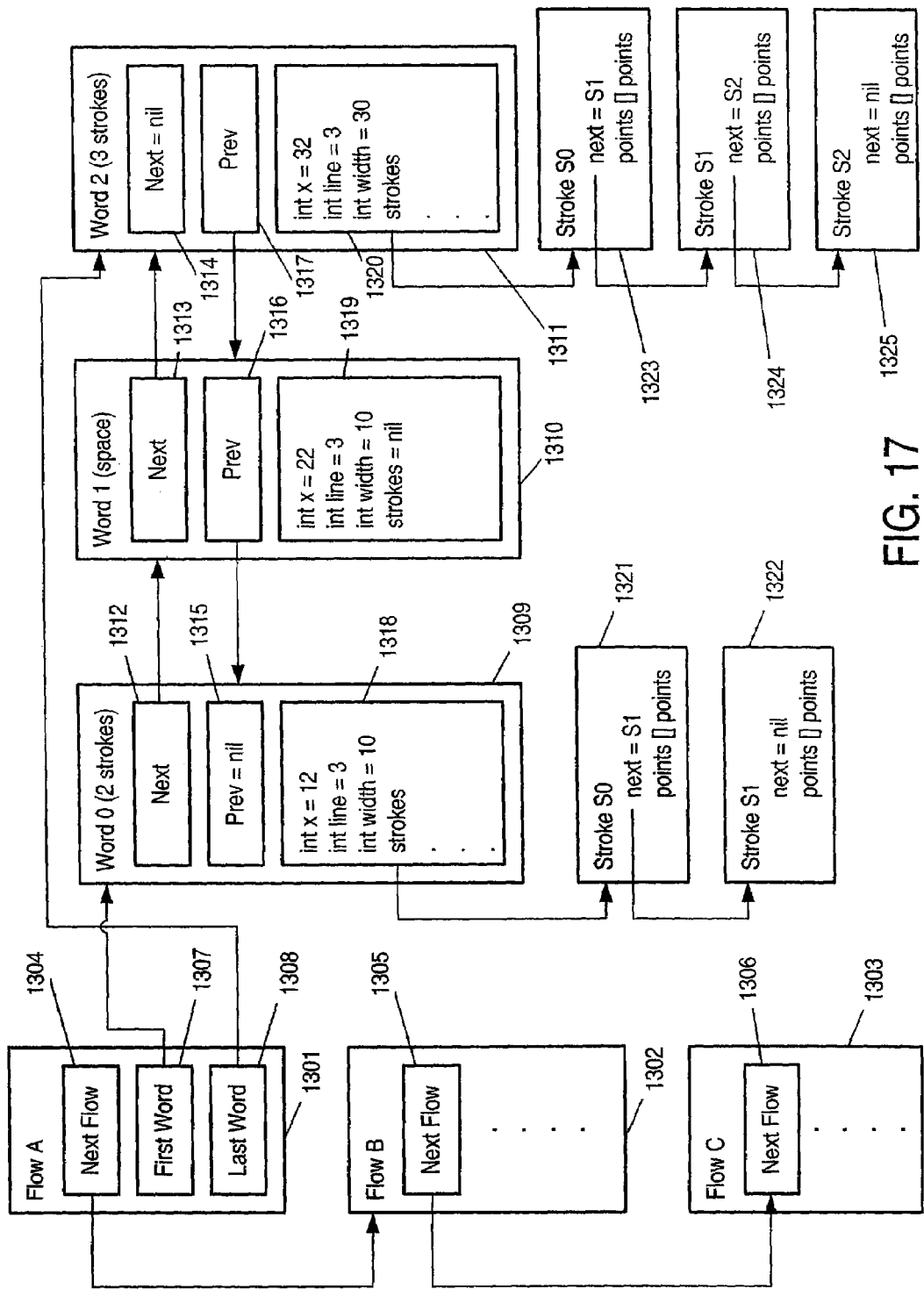

FIG. 17 illustrates an example of another data structure that may be used in connection with various examples of the invention. As illustrated in FIG. 17, the data structure includes a listing of independent flows, namely flow A 1301, flow B 1302, and flow C 1303, with a pointer 1304, 1305, and 1306 to the next flow on the page. Each flow includes a linear list of words. For example, as illustrated for flow A 1301, the flow includes a first word 1307 and a last word 1308.

Each word in the flow links to a word data set, which includes a list of strokes. For example, the first word 1307 in flow A 1301 links to a word data set (Word 0, at reference number 1309). Similarly, the last word 1308 in flow A 1301 links to a word data set, namely Word 2, at reference number 1311. The first and last words 1307 and 1308 of flow A are separated by a space, which is represented in the data structure by a separate word (Word 1 1310) that contains no strokes.

The data set for each word in the flow first includes a pointer to the next word (pointers 1312 and 1313) or an indicator that the word is the last word in the flow (pointer 1314). Additionally, the data set for each word in this example includes a pointer to the previous word (pointers 1316 and 1317) or an indicator that the word is the first word in the flow (pointer 1315).

The data set for each word in the flow also includes an indicator of the initial X-coordinate value, the initial line number on the page grid, and the initial width of the word. See data sets 1318, 1319, and 1320 in FIG. 17. Data sets 1318, 1319, and 1320 also include pointers to the strokes of the word, if any (as noted in FIG. 17, word 1 1310 is a blank space, which is represented as a word containing no strokes).

The strokes of the word are represented by data sets 1321, 1322, 1323, 1324, and 1325 in FIG. 17. Each stroke data set, as illustrated in FIG. 17, includes a pointer to the next stroke or an indicator that the stroke is the final stroke of the word ("next" stroke=nil). The stroke data sets 1321, 1322, 1323, 1324, and 1325 also include a listing of points registered on the digitizer that correspond to the stroke (or another appropriate data representation of the stroke). Additionally, the data structure for each flow or each word may include a pointer to memory that includes a corresponding representation of machine-generated text obtained through use of handwriting recognition software (not shown).

CONCLUSION

While the invention has been described in terms of various specific examples, these specific examples merely exemplify the invention and do not limit it. Moreover, the fact that a specific feature or function of the invention is described in conjunction with a specific example does not mean that this feature or function is limited to use with that specific example of the invention. Rather, unless otherwise specified, the various features and functions described above may be used freely in any example of the invention. Those skilled in the art will appreciate that changes and modifications may be made to the exemplified versions of the invention without departing from the spirit and scope of the invention, as defined in the appended claims.

Appendices

APPENDIX A

```
int i=0;
int a=0;
int f=0;
if(initialFlow != null) i = 1;
if(avgFlow == null){ }
else if(avgFlow == initialFlow) a = i;
        else a = i+1;
if(finalFlow == null){ }
else if(finalFlow == initialFlow) f = i;
else if(finalFlow == avgFlow) f = a;
else f = a+1;
int IAF = 100*i + 10*a + f;
//reject strokes that cross drawing flow boundaries
if(IAF != 111 &&
    ((initialFlow != null && initialFlow.isDrawing) ||
    (avgFlow != null && avgFlow.isDrawing) ||
    (finalFlow != null && finalFlow.isDrawing))) ignoreStroke = true;
if(!ignoreStroke) switch(IAF)
    {
    case 000:
        {
        if(yBot - yTop < 5 && xRight - xLeft < 5)
            ignoreStroke = true;
        else if(!ignoreStroke &&
            grid.canClaim(null, avgLine, xLeft, xRight, rets))
        { //start a new flow
            Flow fl = new Flow(st, avgLine, grid);
            fl.next = flows; flows = fl;
            reek.enqueue(fl.lastWord);
            iWords++;
            activate(fl);
            deactivateOthers( );
        }
        else ignoreStroke = true;
        break;
        }
    case 001:
        {
        ignoreStroke = setup(finalFlow, st, avgLine);
        break;
        }
    case 010:
        {
        ignoreStroke = setup(avgFlow, st, avgLine);
        break;
        }
    case 011:
        {
        ignoreStroke = setup(avgFlow, st, avgLine);
        break;}
    case 012:
        {
        ignoreStroke = setup(avgFlow, st, avgLine);
        break;}
    case 100:
        {
        //this is a comma case
        ignoreStroke = setup(initialFlow, st, finalLine > initialLine?
initialLine:avgLine);
        break;}
    case 101:
        {
        ignoreStroke = setup(initialFlow, st, initialLine);
        break;}
    case 102:
        {
        ignoreStroke = true;
        break;}
    case 110:
        {
        ignoreStroke = setup(avgFlow, st, avgLine);
        break;}
    case 111:
        {
        if(finalLine > initialLine) ignoreStroke = setup(initialFlow,
st, initialLine);
            else ignoreStroke = setup(avgFlow, st, avgLine);
```

APPENDIX A-continued

```
            break;}
    case 112:
        {
        ignoreStroke = setup(avgFlow, st, avgLine);
        break;}
    case 120:
        {
        ignoreStroke = setup(avgFlow, st, avgLine);
        break;}
    case 121:
        {
        ignoreStroke = setup(avgFlow, st, avgLine);
        break;}
    case 122:
        {
        if (finalLine > initialLine) ignoreStroke = setup(initialFlow,
st, initialLine);
            else ignoreStroke = setup(avgFlow, st, avgLine);
        break;}
    case 123:
        {
        ignoreStroke = true;
        break;}
    default:
        {
        break;
        }
    }
```

APPENDIX B

```
private bool setup(Flow f, Stroke st, int Line)
{
    if(!f.Mode) return true; //ignore the stroke if the flow isn't in
inking mode
    bool ignoreStroke = false;
    if(f.isDrawing)//
    {
        //add the stroke to the drawing flow
    }
    else
    {
        ignoreStroke = !f.addStroke(st, Line, grid);
    }
    if(!ignoreStroke)
    {
        activate(f); //make the current flow the active flow
        deactivateOthers( ); //and inactivate other flows
    }
    return ignoreStroke;
}
```

APPENDIX C

```
    public bool addStroke(Stroke st, int sline, PageGrid grid)
{
    int off = (lastWord != null && lastWord.displayText)? 0:IR0OFFSET;
    // "off" is an offset that artificially moves the boundary of IR0
    // slightly to the right. This causes the stroke to start a new word only
    // if there is an amount of space greater than IR0OFFSET between the right
    // end of the last Word and the left end of the new stroke.
    if(ir0.test(st,sline,off))
    { //the stroke started in IR0.
        clearIRs(grid); //remove the insertion regions and free the space they occupy.
        int lastX = lastWord.x + lastWord.width;
        if(grid.canClaim(this, sline, lastX + 1, st.x + st.width, rets)) //check
        //whether there is room for the stroke
        {
            ...
            // Add a space word plus a new word containing the stroke
            // to the flow.
            return true;
        }
    }
}
else if (ir1.test(st, sline, 0))
{ //stroke started in IR1.
    clearIRs(grid); //remove insertion regions as above
    if(grid.canClaim(this,sline, st.x, st.x + st.width, rets))
    {
        //Add a new word
        return true;
    }
}
else
{ //the stroke started in the flow, but not in one of the insertion regions.
    clearIRs(grid);
    Word w = lastWord;
    int stleft = st.x;
    int stright = st.x + st.width;
    while (w != null && !w.intersects(sline, stleft, stright))
    {
        w = w.prev;
    }
    if (w != null) //we found a word willing to accept the stroke
    {
        if(w.merge(this,st,grid)) //merge the stroke into the word
            { //incorporate the stroke into the word.
                grid.claimSpace(this, sline, st.x, st.x + st.width);
                checkFlowWidth(sline, st);
                setIRs(grid);
                return true;
            }
    }
}
setIRs(grid);
return false;
```

APPENDIX D

```
    public bool intersects(int 1, int sl, int sr)
{
    //A stroke intersects a word if its left or right end is within the span of the word,
    //or if it completely straddles the word.
    //To intersect space, the stroke must fall completely within the space word
    if (1 != Line) return(false); //the Word and the stroke are on different lines
    int wl = bounds.X; //bounds.X is the x coordinate of the left end of the Word
    int wr = bounds.X + bounds.Width;;
    if (strokes == null)
    { // This word is space. Shrink it if the previous word is on the same line,
    //has strokes, and is not currently displaying as text.
        if(prev != null && prev.line == 1 && prev.strokes != null &&
            !prev.displayText)
            wl += Flow.IR0OFFSET; //shrink the space
        if(sl > wl && sr < wr) return(true);
    }
    else
    {
        if(!DisplayText) wr += Flow.IR0OFFSET; //expand the word
        if((wl <= sl && wr >= sl) || //word surrounds stroke
            (wl <= sr && wr >= sr)|| //stroke's right end is in the word
```

APPENDIX D-continued

```
            (wl <= sl && wr >= sl) || //stroke's left end is in the word.
            (sl<=wl && sr >= wr)) //stroke surrounds word
            return(true);
    }
return(false);
}
```

APPENDIX E

```
    public bool merge(Flow f, Stroke s, PageGrid grid, Reco reek)
    {
            if(strokes == null)
            { //adding a stroke to space. There is no problem with claiming space since it
is already owned
                //make a new Word for the stroke and replace the original
                //space with three words: A space, the new word, and a
                //trailing space. The total width is equal to the original
                // space's width.
            }
            else
            {
                //When adding a stroke to an extant word, the stroke may
                //make the word wider. For this reason, we must check
                //that the additional space (if any) is claimable. newLeft
                //and newRight are the merged Word's left and right x
                //coordinate
                int newLeft = Math.Min(bounds.X, s.x)
                int newRight = Math.Max(bounds.X + bounds. Width, s.x + s.width);
                if (!grid.canClaim(f, Line, newLeft, newRight, rets)) return false;
                //add the stroke to the Word.
                .... (code elided)
                /*We can't really fix up the word spacing until the next
                Reflow, but it's important to shrink adjacent space at the
                new Word's right since otherwise, another stroke added
                near the end of the newly-widened word could be claimed
                (incorrectly) by the adjacent space. */
                if(next != null && next.isSpace( ) && next.line == line)
        {
            int nextRight = next.x + next.width;
            next.x = newRight + 1;
            int nextWidth = nextRight - next.x;
            if (nextWidth < 1)
            {
                //we don't allow negative widths.
                nextWidth = 1;
            }
            next.width = nextWidth;
        }
    }
    return true;
}
```

I claim:

1. A system for creating and processing flows comprising:
a digital display device including a display screen;
a processor controlling at least some operations of the system; and
a memory storing computer executable instructions that, when executed by the processor, cause the system to perform a method comprising:
receiving input points representing electronic ink data;
grouping the input points into strokes and grouping the strokes into at least a first flow;
determining a screen region associated with the first flow, the screen region corresponding to a size, shape, and position on the display screen of the digital display device;
displaying the first flow in the associated screen region on the digital display device;
receiving user input at a first point within the screen region associated with the first flow; and
modifying the display of the first flow on the digital display device in response to the user input, wherein the modification comprises changing one or more of the size, the shape, and the position of the screen region associated with the first flow, wherein the modification does not add or remove any strokes from the first flow, and wherein the modification comprises dragging the first flow to a different region of the screen, without changing the width or height of the screen region associated with the first flow.

2. The system according to claim 1, wherein said first flow includes at least one insertion region.

3. The system according to claim 1, wherein the method further comprises:
displaying at least the first flow and a second flow;
wherein said modification is at least partially dependent on a location of said second flow on said digital display device.

4. The system according to claim 1, wherein the method further comprises determining whether a new stroke is associated with the first flow, wherein the new stroke is determined to be associated with the first flow when at least a predetermined portion of the new stroke is located within the first flow.

5. The system according to claim 4, wherein the method further comprises determining whether the new stroke is associated with the first flow, at least in part, by identifying an initial user input device contact point; by determining whether the initial user input device contact point is located in the first flow, in another flow, or in an unclaimed region; by identifying a final user input device contact point; and by determining whether the final user input device contact point is located in the first flow, in another flow, or in the unclaimed region.

6. The system according to claim 1, wherein the method further comprises determining whether a new stroke is associated with an existing flow, wherein the new stroke is determined to be associated with an existing flow when at least a predetermined portion of the new stroke is located within an existing flow.

7. The system according to claim 6, wherein, when the new stroke is determined not to be associated with an existing flow, a new flow is defined on the page template, wherein the new flow contains the new stroke.

8. A system for creating and processing flows comprising:
a digital display device including a display screen;
a processor controlling at least some operations of the system; and
memory storing computer executable instructions that, when executed by the processor, cause the system to perform a method comprising:
receiving input points representing electronic ink data;
grouping the input points into strokes and grouping the strokes into at least a first flow;
determining a screen region associated with the first flow, the screen region corresponding to a size, shape, and position on the display screen of the digital display device;
displaying the first flow in the associated screen region on the digital display device;
receiving user input at a first point within the screen region associated with the first flow; and
modifying the display of the first on the digital display device in response to the user input, wherein the modification comprises changing one or more of the size, the shape, and the position of the screen region associated with the first flow, wherein the modification does not add or remove any strokes from the first flow, and wherein the modification comprises dragging the first flow to a new region of the screen, and wherein at least one of the width and the height associated with the first flow are changed to avoid overlapping a second flow displayed proximately to the new region of the screen.

9. The system according to claim 8, wherein said modification comprises reducing the size of the region associated with said first flow, and repositioning at least some of the strokes in the first flow to fit within the reduced screen region.

10. The system according to claim 8, wherein said modification comprises enlarging the size of the region associated with said first flow, and repositioning at least some of the strokes in the first flow to create empty space within the enlarged screen region of the first flow.

11. A system according to claim 8, wherein the first flow comprises a plurality of word groupings, and wherein the modification comprises adjusting an overall width of the first flow region in the X coordinate direction, and reflowing the plurality of word groupings of the first flow region to correspond to the overall width.

12. A system according to claim 8, wherein the first flow comprises a plurality of word groupings, and wherein the modification comprises adjusting an overall height of the first flow region in the Y coordinate direction, and reflowing the plurality of word groupings of the first flow region to correspond to the overall height.

13. The system according to claim 8, wherein said first flow includes at least one insertion region.

14. The system according to claim 8, wherein the method further comprises determining whether a new stroke is associated with the first flow, wherein the new stroke is determined to be associated with the first flow when at least a predetermined portion of the new stroke is located within the first flow.

15. The system according to claim 14, wherein the method further comprises determining whether the new stroke is associated with the first flow, at least in part,
by identifying an initial user input device contact point;
by determining whether the initial user input device contact point is located in the first flow, in another flow, or in an unclaimed region;
by identifying a final user input device contact point; and
by determining whether the final user input device contact point is located in the first flow, in another flow, or in the unclaimed region.

16. The system according to claim 8, wherein the method further comprises determining whether a new stroke is associated with an existing flow, wherein the new stroke is determined to be associated with an existing flow when at least a predetermined portion of the new stroke is located within an existing flow.

17. The system according to claim 16, wherein, when the new stroke is determined not to be associated with an existing flow, a new flow is defined on the page template, wherein the new flow contains the new stroke.

* * * * *